(12) United States Patent
Keefer et al.

(10) Patent No.: US 7,902,114 B2
(45) Date of Patent: Mar. 8, 2011

(54) ADSORBENT COATING COMPOSITIONS, LAMINATES AND ADSORBER ELEMENTS

(75) Inventors: Bowie G. Keefer, Vancouver (CA); Alain A. Carel, Vancouver (CA); Brian G. Sellars, Coquitlam (CA); Ian S. D. Shaw, Richmond (CA); Belinda C. Larisch, Vancouver (CA); David G. Doman, Surrey (CA); Frederick K. Lee, Burnaby (CA); Andrea C. Gibbs, Burnaby (CA); Bernard H. Hetzler, Surrey (CA); James A. Sawada, Vancouver (CA); Aaron M. Pelman, Richmond (CA); Carl F. Hunter, West Vancouver (CA)

(73) Assignee: Xebec Adsorption Inc., Burnaby, British Columbia (CA)

( * ) Notice: Subject to any disclaimer, the term of this patent is extended or adjusted under 35 U.S.C. 154(b) by 746 days.

(21) Appl. No.: 11/876,618

(22) Filed: Oct. 22, 2007

(65) Prior Publication Data

US 2009/0025553 A1   Jan. 29, 2009

Related U.S. Application Data

(63) Continuation of application No. 10/041,536, filed on Jan. 7, 2002, now Pat. No. 7,300,905.

(60) Provisional application No. 60/260,077, filed on Jan. 5, 2001, provisional application No. 60/261,548, filed on Jan. 12, 2001, provisional application No. 60/285,527, filed on Apr. 20, 2001.

(51) Int. Cl.
   *B01J 20/00* (2006.01)

(52) U.S. Cl. ............... 502/400; 502/439; 502/527.23

(58) Field of Classification Search .............. 502/439, 502/400, 527.19, 527.22, 527.23, 527.24; 422/168
   See application file for complete search history.

(56) References Cited

U.S. PATENT DOCUMENTS

| | | | |
|---|---|---|---|
| 3,713,281 A | 1/1973 | Asker et al. |
| 4,964,889 A | 10/1990 | Chao |
| 5,052,188 A | 10/1991 | Komarneni et al. |
| 5,082,473 A | 1/1992 | Keefer |
| 5,152,813 A | 10/1992 | Coe et al. |
| 5,174,979 A | 12/1992 | Chao et al. |
| 5,175,137 A | 12/1992 | Golden et al. |
| 5,194,414 A | 3/1993 | Kuma |
| 5,232,474 A | 8/1993 | Jain |
| 5,258,058 A | 11/1993 | Coe et al. |
| 5,401,706 A | 3/1995 | Fischer |
| 5,413,625 A | 5/1995 | Chao et al. |
| 5,415,748 A | 5/1995 | Emiliani et al. |
| 5,417,957 A | 5/1995 | Coe et al. |
| 5,419,891 A | 5/1995 | Coe et al. |
| 5,464,467 A | 11/1995 | Fitch et al. |
| 5,531,808 A | 7/1996 | Ojo et al. |
| 5,587,003 A | 12/1996 | Bülow et al. |
| 5,591,691 A | 1/1997 | Friedman et al. |
| 5,604,174 A | 2/1997 | Friedman et al. |
| 5,667,560 A | 9/1997 | Dunne |
| 5,786,031 A | 7/1998 | Retallick et al. |
| 5,795,456 A | 8/1998 | Friedman et al. |
| 5,897,686 A | 4/1999 | Golden et al. |
| 5,968,235 A | 10/1999 | Grime et al. |
| 5,980,611 A | 11/1999 | Kumar et al. |
| 6,042,797 A | 3/2000 | Ogawa et al. |
| 6,051,050 A | 4/2000 | Keefer et al. |
| 6,624,115 B2 | 9/2003 | Schuh et al. |

FOREIGN PATENT DOCUMENTS

| | | |
|---|---|---|
| CA | 2306311 | 10/2001 |
| EP | 0 685 429 | 12/1995 |
| EP | 0 685 430 | 12/1995 |
| EP | 1 046 422 A2 | 10/2000 |
| GB | 1 580 928 | 10/1980 |
| WO | WO 99/15259 | 4/1999 |
| WO | WO 99/28013 | 6/1999 |
| WO | WO 00/40332 | 7/2000 |
| WO | WO 00/76628 A1 | 12/2000 |

OTHER PUBLICATIONS

Barthomeuf, D. "Basic Zeolites: Characterization and Uses in Adsorption and Catalysis" *Catalysis Reviews, Science and Engineering*, vol. 38, No. 4, pp. 521-612 (1996).

(Continued)

*Primary Examiner* — Edward M Johnson
(74) *Attorney, Agent, or Firm* — Klarquist Sparkman, LLP

(57) ABSTRACT

Using zeolites as the active adsorbent, adsorbent laminates have been fabricated with various sheet supports. These adsorbent laminates have been successfully operated for oxygen enrichment at high PSA cycle frequencies, such as upwards of at least 150 cycles per minute. Methods for making suitable adsorbent laminates are described. The methods generally involve forming a slurry comprising a liquid suspending agent, an adsorbent and a binder. Laminates are made by applying the slurry to support material or admixing support material with the slurry. The slurry can be applied to support material using a variety of techniques, including roll coaters, split roll coaters, electrophoretic deposition, etc. One method for making laminates by mixing support material with the adsorbent slurry comprises depositing the slurry onto a foraminous wire, draining the slurry material, and pressing the material to form a ceramic adsorbent paper. Spacers can be formed on adsorbent laminates to space one laminate from another. The spacer dimensions can be uniform, or can vary along a laminate, such as increasing in height from a first end to a second end of the laminate. Gas flow-through apertures also can be formed on laminates. The laminates are adjacent one another to define flow channel between adjacent bodies, whereby a portion of a gas flowing through the flow channels flows through the apertures to facilitate pressure equalization in the adsorbent structure.

26 Claims, 29 Drawing Sheets

OTHER PUBLICATIONS

Chon, et al. "Progress in Zeolite and Microporous Materials" *Studies in Surface Science and Catalysis*, vol. 105, 27 pages (1997).

Chue, et al. "Comparison of Activated Carbon and Zeolite 13X for $CO_2$ Recovery from Flue Gas by Pressure Swing Adsorption" *Ind. Eng. Chem. Res.* 34:591-598 (1995).

Dyer, A. "An Introduction to Zeolite Molecular Sieves" Chichester, John Wiley & Sons, pp. 67-127 (1988).

Ghosh, et al. "Solid Desiccant Dehumidification Systems" *Studies in Surface Science and Catalysis*, vol. 120, pp. 879-916 (1988).

Hufton, et al. "Sorption-Enhanced Reaction Process for Hydrogen Production" *AIChE Journal*, vol. 45, No. 2, pp. 248-256 (Feb. 1999).

Iyuke, et al. "Application of Sn-activated carbon in pressure swing adsorption for purification" *Chemical Engineering Science*, 55: 4745-4755 (2000).

Karge, H. "Post-Synthesis Modification of Microporous Materials by Solid State Reactions" *Studies in SurfaceScience and Catalysis*, vol. 105, pp. 1901-1948 (1997).

Kühl, G. "Crystallization of Low-Silica Faujasite ($SiO_2/Al_2O_3$~2.0)" *Zeolites*, vol. 7, pp. 451-457 (Sep. 1987).

Rege, S. "Sorbents for Air Purification in Air Separation" *Chemical Engineering Science*, 55:4827-4838 (2000).

Sircar, et al. "Purification of Hydrogen by Pressure Swing Adsorption" *Separation Science and Technology*, 35(5), pp. 667-687 (2000).

Townsend, R. P. "Ion Exchange in Zeolites" Ch. 10. pp. 359-390 (1991).

Verdonck, et al. "Catalysis by a Ruthenium Complex Heterogenized in Faujasite-type Zeolites: the Water Gas-shift Reaction" *J.C.S. Chem Comm.* pp. 181, 182 (1979).

International Search Report from Applicant's Co-Pending International Application No. PCT/US02/00470.

Wet print reapplied on cured dots

Gluing

ADSORBENT COATING COMPOSITIONS, LAMINATES AND ADSORBER ELEMENTS

This application is a continuation application of application Ser. No. 10/041,536, filed on Jan. 7, 2002 now U.S. Pat. No. 7,300,905, which claims the benefit of the earlier filing dates of U.S. provisional patent applications Nos. 60/260,077, filed on Jan. 5, 2001; 60/261,548, filed on Jan. 12, 2001; and 60/285,527, filed on Apr. 20, 2001. Each of applicants' prior applications is incorporated herein by reference.

FIELD

The present invention concerns laminates and adsorber elements that are useful for pressure swing adsorption processes.

BACKGROUND

Gas separation can be accomplished by flowing a mixture of gases over an adsorbent that preferentially adsorbs a more readily adsorbed component relative to a less readily adsorbed component of the mixture. Examples of such processes include temperature swing adsorption (TSA) and pressure swing adsorption (PSA). Pressure swing adsorption generally involves coordinated pressure cycling of a gaseous mixture over an adsorbent material. The total pressure is elevated during intervals of flow in a first direction through the adsorbent bed, and is reduced during intervals of flow in the reverse direction. As the cycle is repeated, the less readily adsorbed component is concentrated in the first direction, while the more readily adsorbed component is concentrated in the reverse direction.

In early work in this field, Milton's U.S. Pat. Nos. 2,882,243 and 2,882,244 described the preparation of type A and type X zeolites, and the use of these materials to separate components of gas mixtures. Other workers in the field recognized the importance of using zeolites having small and uniformly sized crystals as adsorbents for gas separation processes. Kostinko's U.S. Pat. No. 4,443,422 describes a zeolite A having an average particle size of less than 1.7 microns and a zeolite X having an average particle size of less than 2.2 microns, and further provides a detailed summary of the patent literature in the field of zeolite preparation.

Commercial gas separation and chemical gas reactor devices typically use a granular or pelletized form to hold the crystals in contact with the fluid flow. In many cases, additional benefits are realized by reducing the containment vessel volume, weight, cost, pressure drop and increasing robustness. A reduction in the volume will increase fluid velocities, which increases fluid forces on the adsorbent particles, increases fluid pressure drop across the length of the device, and also reduces the time available for mass transfer between the fluid and the adsorbent.

Hence, a need developed for rigid, low fluid resistance, high-surface-area adsorbent supports that overcome the limitations of granular adsorbent beds.

Supported adsorbent materials are known for use with TSA processes. For example, corrugated materials having adsorbent material applied thereto are known for use with TSA processes. Rigid, high-surface-area adsorbent structures, such as stacked or spirally wound adsorbent-impregnated sheet material, also are known for use in PSA devices operating at relatively low cycle frequencies. Examples of such adsorbent structures are disclosed in Keefer's U.S. Pat. Nos. 4,702,903, 4,801,308 and 5,082,473, which are incorporated herein by reference. Keefer's U.S. Pat. No. 4,801,308 discloses a PSA apparatus having an adsorbent structure comprising adsorbent sheets. Adsorbent sheets also may be adapted for use in rotary type pressure swing adsorbers. Keefer et al.'s U.S. Pat. No. 6,051,050, for example, which is incorporated herein by reference, discloses a rotating pressure swing adsorption apparatus comprising a rotor adapted to receive a plurality of circumferentially spaced adsorbent structures, each of which comprises multiple adsorbent sheets.

As outlined in U.S. Pat. No. 5,082,473, gas separation by pressure swing adsorption (PSA) is advantageously conducted using laminated, parallel passage adsorbers. These "adsorbent laminate" adsorbers provide high surface area and relatively low-pressure drop. Thin adsorbent sheets are separated by spacers which establish the gap height between adjacent sheets and thus define flow channels between each pair of adjacent sheets.

SUMMARY

As PSA processes evolve, the need for compact devices, and devices which operate at cycle frequencies considerably higher than currently used for commercial applications, has increased. It has become apparent that known adsorbent structures are inadequate. For example, compact devices, such as may be used for medical oxygen production, require adsorbent structures considerably reduced in weight relative to known structures. These compact devices also must be capable of high productivity and efficiency while producing an acceptably pure gas. If there is too much channel inconsistency, then productivity and gas purity are comprised. If one flow channel is larger than an adjacent gas flow channel, then premature product break through may occur, which reduces the purity of the product gas to unacceptable purity levels. Moreover, devices operating at cycle frequencies greater than 50 cycles per minute require greater flow channel uniformity and less pressure drop than has heretofore been required. If too much pressure drop occurs across the bed, then higher cycle frequencies, such as on the order of greater than 100 cycles per minute (cpm), are not readily achieved. As cycle frequencies steadily increase the need for new adsorbent structures capable of operating at these higher frequencies also increases.

High performance adsorbent laminates must be manufactured with high precision so that flow channels between adsorbent layers are uniform in thickness. This helps maintain narrow concentration fronts, so that high product productivity and recovery can be achieved at high purity. Hence, both the thickness of the applied adsorbent layer on the support, and the height of the spacers defining the channels, must be established with high accuracy and consistency. The present invention provides adsorbent laminate configurations achieving the necessary accuracy.

Using zeolites as the active adsorbent, adsorbent laminates have been fabricated with various sheet supports. These adsorbent laminates have been successfully operated for oxygen enrichment at high PSA cycle frequencies, such as at 10 cycles per minute or greater, generally greater than 50 cycles per minute, preferably at least 150 cycles per minute, more preferably 200 cycles per minute, and even more preferably approaching 300 cycles per minute or greater.

Methods for making suitable adsorbent laminates for high frequency PSA processes are described. The methods generally involve forming a slurry comprising a liquid suspending agent, an adsorbent and a binder. Disclosed slurries typically comprise an adsorbent and one or more colloidal materials generally capable of forming a gel, such as colloidal silica-based binders, colloidal alumina, colloidal zirconia, and mixtures of colloidal materials. The adsorbent can be formed in situ. Slurries can be water based, organic based or aqueous mixtures comprising organic materials.

Laminates are made by applying the slurry to support material or admixing support material with the slurry. For support material having two major planar surfaces, such as sheets, adsorbent compositions may be applied to one or both sides of the support material. The slurry can be applied to support material using a variety of techniques, including using a transfer roll, a roll coater, a split roll coater, a spray coater, a sequester roller, a flooded-nip coater, etc. Adsorbent material compositions also can be applied to support material by dip coating, by electrophoretic deposition, and other methods known for coating materials, such as are known for paper coating and other industries. Electrophoretic deposition can be used to apply adsorbent material compositions to nonconducting supports by rendering such supports conducting by, for example, application of conducting materials, such as graphite.

For slurries applied to support material, the method may comprise milling the slurry to form a milled slurry, and thereafter applying the milled slurry to the support material. Disclosed embodiments milled the slurry from an initial viscosity prior to milling of greater than 200 cps, to a second viscosity subsequent to milling of less than 150 cps. Milling the intermediate slurry increases the density of the adsorbent material applied to the support. For a lithium-exchanged zeolite, current embodiments used a zeolite having an initial particle size of from about 3 to about 3.3 micrometers, and such zeolite was milled to a second particle size of from about 2.5 to about 2.8 micrometers.

A particular disclosed slurry for applying to support material comprised water, isopropyl alcohol, Ludox (colloidal silica binder), naturally occurring zeolite products, such as Odorlok, and other desired zeolites. Support material was selected from the group consisting of conducting and non-conducting materials, including without limitation, glass fibers, ceramic fibers, scrim, stainless steel, metal foil, metal mesh, carbon fiber, cellulosic materials, polymeric materials, and combinations of these materials. For metal-mesh support material, the slurry is advantageously applied to the metal mesh by electrophoretic deposition. The metal mesh may be surface prepared prior to deposition of the slurry material, such as by oxidation, anodization, texturing, and combinations thereof.

Laminates also can be made by mixing support material with the adsorbent slurry compositions. In such cases, disclosed slurries typically comprised colloidal materials generally capable of forming gels, such as colloidal silica, ceramic fiber, glass fiber and zeolite. One method for making such laminates includes depositing the slurry onto a foraminous wire, draining the slurry material, and pressing the material to form a ceramic adsorbent paper. A reactive binder, such as an alginate-binder, can be applied to the slurry material on the foraminous wire.

After application to the adsorbent layers the adsorbent typically is macroporous, with a fine structure of micropores in the adsorbent material within which the adsorptive separation takes place, with a coarser structure of macropores providing enhanced diffusive and convective access from the flow channel to the micropores. The thickness of the adsorbent layers on one or both sides of the channels must be sufficient for effective function of the PSA process.

The dimensions of adsorbent structures may vary. However, typical disclosed adsorbent laminates have flow channel lengths of from about 1 centimeter to about 1 meter, and more typically about 5 cm to about 30 cm, a channel gap height of 50 to 250 microns, and an adsorbent coating thickness of 50 to 300 microns on one or both sides of the sheets. Adsorbent laminates with these dimensions have been used in devices operating at PSA cycle frequencies up to at least 150 cycles/minute. The flow channel length may be correlated with cycle speed. At low cycle speeds, such as from about 20 to about 40 cycles per minute, the flow channel length can be as long as one meter. For cycle speeds greater than 40 cycles per minute, the flow channel length typically is decreased, and may vary from about 5 centimeters to about 30 cm. The present invention contemplates that the adsorbent coating may be 5 to 100 microns thick, more preferably about 25 to 60 microns thick, with thinner coatings used for cycle frequencies of 300 cycles/minute or more.

Spacers can be formed on adsorbent laminates to space one laminate from another. The spacer dimensions can be uniform, or can vary along a laminate, such as increasing in height from a first end to a second end of the laminate. Gas ventilation apertures also can be formed on laminates, which allow both fluid flow and diffusion to occur between adjacent channels, thereby facilitating pressure equalization in the adsorbent structure. Ventilation apertures typically are useful for compensating for non-uniformity in flow channel structures and dimensions.

Adsorber elements comprising at least two laminates and including spacers and perhaps ventilation apertures also are described. Adsorber elements can be stacked or otherwise configured in series along a gas flow path. Laminates and/or one or more adsorber elements described herein are used in PSA processes and devices particularity rotary PSA devices operating at high cycle frequencies. Such PSA devices can be coupled to other devices, such as fuel cells.

DETAILED DESCRIPTION

I. Introduction

Figure 1A:
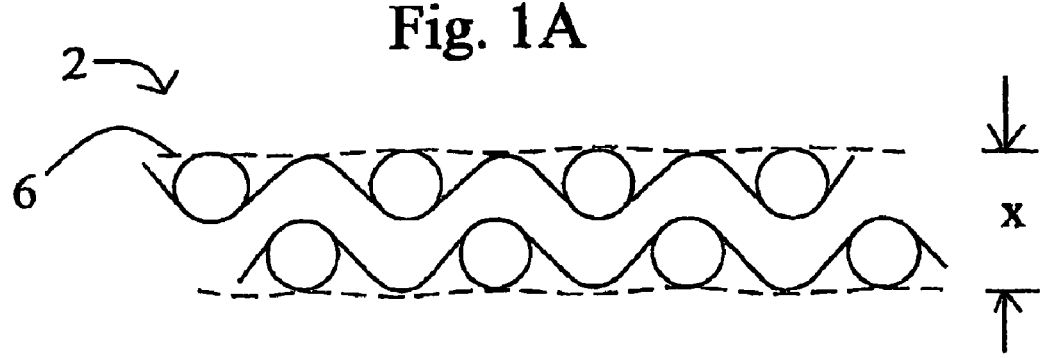
FIG. 1 illustrates a first laminate with an adsorbent coated on both sides (double-sided coating) and a second laminate with adsorbent material applied to just one side (single-sided coating).

Gas separation devices that operate by preferential gas adsorption require an adsorbent structure over, through or about which a gaseous mixture can be flowed to achieve gas adsorption. A slurry comprising an adsorbent material or materials can be used to form these adsorbent structures, referred to herein as laminates or adsorber elements. The slurry is combined with support material, or is applied to support material, to form adsorbent laminates or elements. Slurry materials, methods for making slurries comprising such materials, and methods for making laminates or adsorber elements using the slurries, are described in more detail below.

II. Definitions

1. Support—a support is any material to which or about which adsorbent material is applied to form an adsorbent structure.

2. Laminate—is a structure formed from a support and at least one adsorbent material, and perhaps other materials, such as catalysts, over, about or through which a mixture of gasses can be flowed for gas adsorption, separation and/or a gas phase chemical reaction.

3. Adsorber element—is a structure formed from plural laminates, or from an elongate laminate, such as a spirally wound laminate.

4. PSA Apparatus—an apparatus that contains a process fluid and at least one adsorber material and enables a PSA process to occur with the process fluid and the at least one adsorber.

5. Spacer—A spacer is a structure or material that defines a separation between adsorbent laminates. The type of spacers that can be employed may consist of, but are not limited to, dimensionally accurate: plastic, metal, glass, or carbon mesh; plastic film or metal foil; plastic, metal, glass, ceramic, or carbon fibers and threads; ceramic pillars; plastic, glass, ceramic, or metal spheres, ovoids, or disks; or combinations thereof.

III. Slurry Composition

The disclosed slurries generally include a liquid for suspending solids material, a binder, and an adsorbent and/or catalytic material, such as a zeolite.

1. Liquid

Water, polar organic liquids, and mixtures thereof are useful for suspending slurry solids. Water is a primary liquid useful for forming suitable slurries. Although not necessary, organic materials help the formulation and coating process, and may interact with the binder material to facilitate the binding activity of the binder, and hence the formation of a stronger matrix for retaining the adsorbent material.

While a number of different organic materials optionally may be used, alcohols have been used in the disclosed embodiments. Particularly useful are aliphatic alcohols having 10 or fewer carbon atoms, referred to herein as lower alcohols. Most typically, the aliphatic alcohols are lower alkyl alcohols. Disclosed embodiments generally used isopropyl alcohol.

2. Binder

The selection of the binder may depend on the particular adsorbent material selected, which in turn depends upon the task that devices comprising adsorbent laminates perform. Colloidal materials capable of functioning as a binder and/or which form a gel are advantageously used. Such colloidal materials include, without limitation, colloidal silica-based binders, colloidal alumina, colloidal zirconia, and mixtures of colloidal materials. "Colloidal silica" refers to a stable dispersion of discrete, amorphous silicon dioxide particles having a particle size ranging from about 1 to about 100 nanometers. Disclosed embodiments used colloidal silicas having an average particle size of from about 5 to about 40 nanometers, and an average surface area of greater than about 200 m²/gram, typically in the range of from about 220-230 m²/gram. Suitable colloidal silica materials also can be surface modified, such as by surface modification with alumina. Colloidal silicas are commercially available from a number of companies, such as Eka Chemicals, Grace Davison, Nalco, etc.

Ludox is one example of a colloidal silica binder used in disclosed embodiments. Ludox can be obtained in a number of formulations, including HS30 and HS40. Ludox can be used alone, or in combination with other materials, such as Odorlok. According to the Zeolite—Material Safety Data Sheet (Canada), Odorlok comprises about 14% alumina, 3% calcium oxide, 1 percent magnesium oxide, and about 4% crystalline silica, the remainder being inert ingredients. Odorlok apparently bridges between zeolite particles, adding to the strength of the laminate produced relative to those formulations using solely colloidal silica as the binder.

The strength of the laminate can be further enhanced by using additional strength increasing agents. Clay materials, such as palygorskite (also known as attapulgite), which are hydrated magnesium aluminum silicates, can be used as binders, alone or in combination with other binders. Palygorskite has an open crystal structure particularly useful for receiving the adsorbent.

Inorganic binders may be inert; however, certain inorganic binders, such as clays, used with zeolite adsorbents may be converted in-situ from kaolin binders to zeolite so that the zeolite is self-bound with minimal inert material. Organic binder used to bind activated carbon particulates may be pyrolyzed to form a useful carbonaceous adsorbent.

3. Adsorbents and Catalysts

Virtually any adsorbent material can be used to practice the present invention. The selection of a particular adsorbent material depends primarily on the desired function, e.g. preferential adsorption of one gas, such as nitrogen, versus other gases in a mixture, and secondarily on other factors, such as availability and cost. Suitable adsorbent materials often are zeolites, which are highly crystalline, alumino-silicate materials comprising $[SiO_4]^{4-}$ and $[AlO_4]^{5-}$ tetrahedral units. Zeolites typically have Si and Al joined by an oxygen bridge, and an overall negative charge, which requires positively charged counter ions, such as $Na^+$, $K^+$ and $Ca^{2+}$. The zeolite may be a hydrophilic zeolite (e.g., suitably ion-exchanged X, A or chabazite-type zeolites as used for air separation and hydrogen purification) or hydrophobic zeolite (e.g., Y, siliceous zeolite, silicate, or silicalite as used for separating organic vapors from humid air).

Zeolites useful for adsorption separation of gases from mixtures are known, and are described in the patent and other literature. Examples include:

U.S. Pat. No. 2,882,244 discloses the direct synthesis and ion exchange of zinc X-zeolite from sodium X-zeolite using zinc nitrate;

Lithium X-zeolite was reported in U.S. Pat. No. 3,140,933 as being useful for nitrogen-oxygen separations;

U.S. Pat. No. 4,481,018 describes various polyvalent cation (particularly alkaline earth elements magnesium, calcium, strontium and barium) X-zeolites and faujasites, which are known to have low silicon-to-aluminum ratios in the order of approximately 1 to 1.2;

U.S. Pat. No. 4,557,736 discusses modifying X-zeolites by ion exchange of available ion sites with several divalent cations to produce a binary, ion-exchanged X-zeolite. The binary ions exchanged comprise calcium and strontium having higher nitrogen adsorption capacity, low heat of nitrogen adsorption and good nitrogen selectivity for air separation;

X-zeolites can be exchanged with lithium to provide an improved nitrogen-selective adsorbent as set forth in U.S. Pat. No. 4,859,217, which states that an improved nitrogen adsorbent can be achieved when an X-zeolite is exchanged with lithium cations at greater than 88% exchange. The base sodium or sodium-potassium form of the X zeolite was exchanged, utilizing conventional ion-exchange procedures and 4 to 12 fold stoichiometric excesses of lithium salts;

Multiple cation exchange of zeolites with alkaline earth metals is disclosed in U.S. Pat. No. 4,964,889;

U.S. Pat. No. 4,880,443, entitled "Molecular Sieve Oxygen Concentrator with Secondary Oxygen Purifier," teaches using a zeolite molecular sieve bed having 5 AMG zeolite coupled to a carbon molecular sieve bed.

U.S. Pat. No. 4,925,460 describes lithium-containing zeolite chabazite.

U.S. Pat. No. 5,258,058, entitled "Nitrogen Adsorption with a Divalent Cation Exchanged Lithium X-Zeolite," describes making sodium, potassium LSX-zeolite by the method of Kuhl ("Crystallization of Low-Silica Faujasite" Zeolites 7:451 (1987). Lithium LSX-Zeolite was prepared by ion exchange of sodium, potassium LSX-zeolite powder using five static exchanges at 100° C. with a 6.3-fold equivalent excess of 2.2M LiCl. Sodium LSX-zeolite was prepared by ion exchange of sodium, potassium LSX-zeolite using three static exchanges at 100° C. with a 4.2-fold equivalent excess of 1.1M NaCl. Various exchange levels of $M^{2+}$, lithium LSX-zeolite were prepared by adding separate samples of the initially prepared lithium LSX-zeolite powder to stoichiometric amounts of 0.1N $M^{2+}$+salt solution with a pH between 5.6 and 7.0 and stirring at room temperature for about 4 hours.

U.S. Pat. Nos. 5,174,979, 5,258,058, 5,413,625, 5,417,957, 5,419,891 and 5,152,813, and 5,464,467 describe binary lithium- and alkaline-earth-exchanged X zeolites;

EPA 0685429 and EPA 0685430 describe lithium-containing zeolite EMT; and

U.K. Patent No. 1,580,928 describes a process for making low silica X-zeolites ("LSX"; where LSX is X-zeolite with a Si/Al=1 in the reference). The process comprises preparing an aqueous mixture of sources of sodium, potassium, aluminate and silicate and crystallizing the mixture at below 50° C., or aging the mixture at 50° C. or below, followed by crystallizing the same at a temperature in the range of 60° C. to 100° C.;

The properties and uses of alkali metal exchanged zeolites are reviewed by D. Barthomeuf in "Basic Zeolites: Characterization and Uses in Adsorption and Catalysis," published in *Catalysis Reviews, Science and Engineering*, (1996), Vol. 38, N4, p. 521. Cation exchange of zeolites also occurs when the base zeolite is brought into intimate, solid-state contact with salts of the desired cations, and, if necessary, heating the mixture. This is discussed in detail by Karge [H. G. Karge: "Solid State Reactions of Zeolites", in Studies in Surface Science and Catalysis, Vol. 105C, Elsevier (Amsterdam) (1996), "Progress in Zeolite and Microporous Materials" (H. Chon, S.-K. Ihm and Y. S. Uh (Editors) p 1901-1948). Solid-state ion-exchange between zeolite sodium Y and metal chlorides (including lithium and potassium chlorides) is described by Borbely et al. (G. Borbely, H. K. Beyer, L. Radics, P. Sandor, and H. G. Karge: Zeolites (1989) 9, 428-431];

Gunter and H. Kuhl in "Crystallization of Low-Silica Faujasite" *Zeolites* (1987) 7, p 451 disclose a process for making low silica X-zeolites comprising dissolving sodium aluminate in water with the addition of NaOH and KOH. Sodium silicate was diluted with the remaining water and rapidly added to the $NaAlO_2$—NaOH—KOH solution. The gelled mixture was then aged; and Ion-exchanging zeolites is discussed at length in chapter 8 of the comprehensive treatise of Breck (Donald W. Breck: "Zeolite Molecular Sieves", Pub. Wiley, New York, 1973). Conventional ion exchange of zeolites is carried out by contacting the zeolite, in either powdered or agglomerated form, using batch-wise or continuous processes, with aqueous solutions of salts of the cations to be introduced. These procedures are described in detail in Chapter 7 of Breck, and have been reviewed more recently by Townsend [R. P. Townsend: "Ion Exchange in Zeolites", in Studies in Surface Science and Catalysis, Elsevier (Amsterdam) (1991)].

The adsorbent may be selective at an elevated operating temperature (e.g., about 250° C. to about 800° C.) for carbon dioxide. Suitable such adsorbents known in the art include alkali-promoted materials. Illustrative alkali-promoted materials include those containing cations of alkali metals such as Li, Na, K, Cs, Rb, and/or alkaline earth metals such as Ca, St, and Ba. The materials typically may be provided as the hydroxide, carbonate, bicarbonate, acetate, phosphate, nitrate or organic acid salt compound of the alkali or alkaline earth metals. Such compounds may be deposited on any suitable substrate such as alumina. Examples of specific materials include alumina impregnated with potassium carbonate and hydrotalcite promoted with potassium carbonate.

Mixed ion adsorbents also can be used. Examples, without limitation, of suitable mixed ion adsorbents include lithium-based zeolites containing silver and copper, such as those described in Yang et al.'s international application No. PCT/US99/29666, international publication number WO 00/40332, which is incorporated herein by reference.

Dessicants

U.S. Pat. No. 4,711,645 Kumar (AP), "Removal of water and $CO_2$ from atmospheric air" discusses the use of activated alumina, zeolite (13X, 5A, Na mordenite) for pressure swing adsorption processes.

Ghosh, T K "Solid Dessicant Dehumidification System", Stud. Surf. Sci. Catal., Vol. 120 (1988), p. 879, discusses temperature swing processes, and particularly $SiO_2$, activated alumina, 13X, and hydrophobic zeolite for $H_2O$ removal.

VOC

U.S. Pat. No. 5,968,235, Grime (Ransburg Corp.) "Method for VOC Abatement," discusses alumino-silicate gels for removing VOCs.

Air Pre-Purification

Rege, S U, "Sorbents for Air Purification in Air Separation," Chem. Eng. Sci., 55 (2000) pp. 4827-4838 13X, AA, clinoptilolite (K, Ca) for pressure and temperature swing adsorption processes.

U.S. Pat. No. 5,052,188 Komarneni (Gas Res. Inst.), "Dessicant material for use in gas fired cooling and dehumidifying Equipment," discusses Y-type zeolite for $H_2O$ removal.

U.S. Pat. No. 667,560, Dunne (UOP), entitled "Ce-exchanged zeolite Y for water removal."

U.S. Pat. No. 4,702,749, Sircar (AP), "Techniques for surface oxidation of activated carbons," which discusses using 13X and activated alumina for pressure and temperature swing adsorption.

U.S. Pat. No. 5,232,474, Jain (BOC) "Pre-purification of air," discusses use of activated alumina for $CO_2$, $H_2O$ separation from air.

U.S. Pat. No. 5,587,003, Bulow, Clinoptilolite, discusses $CO_2$ removal from air for pressure swing adsorption processes.

Hydrogen Separation and Purification

U.S. Pat. No. 5,897,686, Golden (AP), "$CO_2$ removal from $H_2$, $CO_2$ and CO" for pressure swing adsorption using 13X ($1^{st}$), 3A ($2^{nd}$).

CO and Olefin Separation

U.S. Pat. No. 4,717,398 Pearce (BP Chemicals) discusses CuY, Si/Al 1.5-3.0 zeolites.

U.S. Pat. No. 3,789,106 Hay (l'Air Liquide) discusses Cu Mordenite

U.S. Pat. No. 5,175,137, Golden (Air Products) discusses Cu on activated alumina, carbon U.S. Pat. No. 4,917,711, Xie (Peking Univ.), discusses CuCl on zeolite, alumina, silica, activated carbon U.S. Pat. No. 3,497,462, Kruerke (Union Carbide) discusses synthesis of Cu(I) zeolites $CO_2$ Removal U.S. Pat. No. 5,980,611, Kumar (BOC), discusses Si/Al>1.5 zeolite for $CO_2$ removal"

U.S. Pat. No. 5,531,808, Ojo (BOC) "$CO_2$ removal from gas streams using LSX zeolite" discusses many different cations.

$CO_2$ Removal

U.S. Pat. No. 4,765,808 Oigo discusses BaX for CO removal over $N_2$ $CO_2$ Purification Chue, K. T. Ind. Eng. Chem. Res., 1995, 34, 591-598 discusses activated carbon vs 13X for $CO_2$ recovery $CO_2$ Removal in PSA by Sn Activated Carbons Iyuke, S. E., Chem. Eng. Sci. 55 (2000) 4745-4755

Chabazite

U.S. Pat. No. 4,925,460, Coe (AP), discusses lithium chabazites.

U.S. Pat. No. 4,747,854, Maroulis discusses cation exchanged materials, including Ca, Mg, Ni, Na and compares Ca X, Ca, Mordenite and Ca, chabazite.

U.S. Pat. No. 4,732,584, Coe, discusses Ca chabazite and purification rather than bulk separation.

Water Gas Shift

It is known [J. J. Verdonck, P. A. Jacobs, J. B. Uytterhoeven, "Catalysis by a Ruthenium Complex Heterogenized in Faujasite-type Zeolites: the Water Gas-Shift Reaction", J.C.S. Chem. Comm., pp. 181-182, 1979] that ruthenium complexes stabilized within X or Y zeolites provide greater water-gas shift catalytic activity than conventional copper based catalysts. Other water gas shift catalysts known in the art include platinum supported on ceria and transition metal carbides. Iron-chrome catalysts are used for industrial water gas shift reactions at higher temperatures. Keefer et al.'s U.S. patent application entitled "Systems and Processes for Providing Hydrogen to Fuel Cells," filed Oct. 26, 2001, incorporated herein by reference.

Hydrogen Purification

Sircar, S. and Golden, T. C.—"Purification of Hydrogen by Pressure Swing Adsorption," Separation Sci and Technol, 35(5), pp. 667-687, 2000, which discusses 5A and activated carbon.

Sircar, S. and Golden T. C., "Sep. Sci. Tech., Vol. 35, issue No. 5, p. 667 (2000), which references standard adsorbents for pressure swing adsorption processes.

Adsorbents and catalyst can be used in Separation Enhanced Reactors (SER). Examples of SER systems include the steam methane reforming and ammonia synthesis. Steam methane reforming is used to produce hydrogen from natural gas. A steam reforming catalyst (e.g. nickel or a platinum group metal supported on alumina) and a high temperature carbon dioxide adsorbent are supported in the reactor/adsorber. The carbon dioxide adsorbent may be based on potassium carbonate promoted hydrotalcite as developed by J. R. Hufton, S. G. Mayorga and S. Sircar "Sorption Enhanced Reaction Process for Hydrogen Production, AIChEJ 45, 248 (1999)), or another high temperature carbon dioxide adsorbent likewise effective in the presence of high steam partial pressure.

In the example of ammonia synthesis, the reactants are hydrogen and nitrogen, which react to produce ammonia. A bench scale apparatus was operated with a single granular adsorber in the mechanical embodiment of U.S. Pat. No. 4,702,903. The adsorber was loaded with reduced iron catalyst 301, 13-X zeolite and silica gel as the adsorbents.

Ethanol dehydration can be accomplished by using 3A (potassium A zeolite).

Zeolites also are commercially available from such sources as Zeolyst, of Valley Forge, Pa.

Materials other than zeolites can be used alone or in combination to form laminates and adsorber elements comprising slurry material. For example, the adsorbent may be an alumina gel or an active carbon, including carbon fibers. The adsorbent may be catalytically active, or may include an admixture of a catalyst. The adsorbent material also may be a precursor (e.g., metakaolin) that is converted to a useful adsorbent in situ after formation of the laminate, such as after being coated onto a support.

The adsorbent material typically is used as finely divided particles, preferably with a narrow, substantially uniform size distribution. The particles generally are less than 10 microns in size, more typically less than 5 microns. Particle size preferably is selected to provide suitable macroporous diffusion.

4. Additional Materials

Materials in addition to those described above can be added to the disclosed slurries. One example of such material is a water-soluble, high molecular weight, polymeric organic material, such as high-molecular-weight polyvinyl alcohol. High-molecular-weight materials typically are used when support material is added to the slurry, as opposed to support materials where the slurry is applied to the support. These high-molecular-weight materials are added to the slurries to improve laminate green strength (i.e., strength prior to firing).

Flocculating agents also can be used to form the disclosed slurries. Flocculating agents generally are used when the support material is added to the slurry. One example of a useful flocculating agent is cationic starch when used in combination with binder material, such as colloidal silica.

For electrophoretic deposition (EPD), long chain polymeric fibers of, for example, about 0.1 micron to about 5 microns in diameter and about 1 micron to about 150 microns in length may be charged positively at one end or negatively at the other end, and added to the suspension to orient in the field direction normal to the laminate sheet being coated. These fibers entering the coating preferentially orient more or less perpendicular to the substrate. The fibers may be located randomly in the coating, but also may be guided by electrostatic field gradients established by a template to locate the fibers approximately in a regular (e.g. hexagonal) pattern. Upon subsequent firing of the adsorbent coating, these fibers will be removed by volatilization, pyrolysis or combustion to define opened, straight macropores as desired. If the fibers are located in a regular array within the coating by a template, they define a columnar array of macropores, desirably with approximately equal spacing.

IV. Relative Material Amounts in Disclosed Slurries

1. Slurries for Coating Supports

For slurries that are applied to support material, one goal of the present invention is to increase the amount (i.e., density as determined by mass of zeolite per unit area of support) of adsorbent material applied to a support. This requires increasing the amount of zeolite that can be added to the slurry. The disclosed invention has significantly increased the amount of adsorbent material that can be applied to a support relative to known compositions.

The typical solids-to-liquid fraction in disclosed embodiments of such slurries is about 40% liquid/60% solids by weight. One example of a 2-liter slurry composition that has been applied to supports to form certain embodiments of the disclosed laminates is provided below in Table 1.

TABLE 1

| Material | Amount | Approximate Weight Percent |
|---|---|---|
| 1. Water | 1. 525 grams | 1. 21 |
| 2. Isopropyl Alcohol | 2. 140 grams | 2. 6 |
| 3. Ludox HS40 | 3. 250 grams | 3. 10 |
| 4. Odorlok | 4. 110 grams | 4. 4 |
| 5. Zeolite (comprising about 25% water by weight of zeolite) | 5. 1500 gams | 5. 59 |

2. Slurries Comprising Support Material

Slurries comprising support material generally are less concentrated with respect to the amount of adsorbent material added to the slurry relative to slurries applied to support material. For example, disclosed embodiments with support material added thereto typically comprise less than about 20% by weight solids, generally 10% or less solids, and typically from about 2% to about 10% by weight solids.

Table 2 provides relative amounts of dry materials added to form one example of a slurry having support material admixed therewith. The ceramic fiber has an average diameter of less than about 10 microns, and typically from about 3 microns to about 6 microns. The glass fibers are relatively long fibers having average typical lengths longer than about 12 millimeters, and preferably shorter than about 50 millimeters. The milled glass fibers have fiber diameters of less than about 20 microns, with diameters generally ranging from about 10 to about 15 microns.

TABLE 2

| Material | Weight Percent |
|---|---|
| 1. Colloidal silica | 1. 2%-25% |
| 2. Ceramic Fiber | 2. 0%-25% |
| 3. Glass Fiber | 3. 2%-20% |
| 4. Zeolite | 4. 50%-90% |

V. Slurry Formation

Slurries of the disclosed invention were prepared in a high shear mixer. The order in which materials are mixed can be varied, and the mixing order is not critical to the effectiveness of the slurry formed.

All nonabsorbent materials were added to form a homogenous mixture. Adsorbent material is then added to the homogeneous mixture slowly with continued mixing. As the adsorbent material is added, the viscosity of the mixture increases. The viscosity of the slurry so formed, referred to herein as an intermediate slurry, is about 230 centipoise (cps) at 25° C. and a mixer speed of about 100 rpm as measured by a Brookfield viscometer.

A ball or jar mill is used to change the particle size distribution of the intermediate slurry. Portions of the slurry are placed in containers containing milling agents, such as ceramic rocks, and the jars are placed on a jar mill. The processing time of the intermediate slurry by the jar mill varies depending on a number of factors, including amount of slurry in the jar, size of the milling stones, initial viscosity of the slurry, jar rotation rate, etc. Working embodiments of the process have wet milled the slurry components for a period of time of from about 10 minutes to about 3 days, with a typical milling time being from about 4 to about 24 hours. Milling the intermediate slurry decreases the slurry viscosity from a first viscosity at 25° C. of greater than about 200 cps, typically about 230 cps, to a second viscosity typically less than about 150 cps, such as about 140 cps.

Milling the slurry provides several significant advantages for slurries applied to support material. Changing the average particle size distribution of the intermediate slurry increases the density of the adsorbent on the laminate. Moreover, changing the average particle size distribution of the intermediate slurry produces a better laminate with greater strength and less dusting propensity.

VI. Adsorbent Support Materials

Figure 1B:
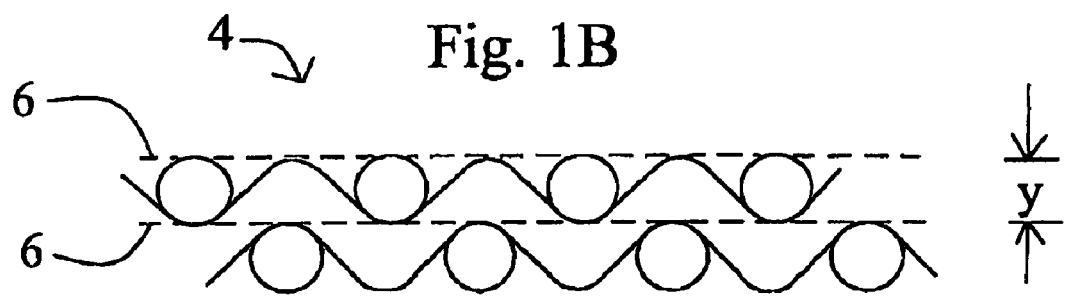

Any material to which the disclosed slurries can be applied to form a laminate, or which can be added to the slurry to form a laminate, and then be useful in a gas separation or gas phase reaction device, can be used as a support material. Such materials include, without limitation, glass fibers, milled glass fiber, glass fiber cloth, fiber glass, fiber glass scrim, ceramic fibers, metallic woven wire mesh, expanded metal, embossed metal, surface-treated materials, including without limitation surface-treated metals, metal foil, metal mesh, carbon-fiber, cellulosic materials, polymeric materials, and combinations of these materials. Monolithic structures, extruded or otherwise, such as cordiorite, also can be used. Coated supports typically have two major opposed surfaces, and one or both of these surfaces can be coated. See FIG. 1, which illustrates both a double sided coating 2 and a single sided coating 4. The support 6 for both illustrated embodiments is stainless steel wire mesh. Double-sided coatings 2 have an adsorbent layer thickness designated as X in FIG. 1A. Single-sided coatings have an adsorbent layer thickness designated as Y in FIG. 1B. Support sheets may be individual, pre-sized sheets, or may be made of a continuous sheet of material. The thickness of the substrate plus applied adsorbent or other materials (such as desiccant, catalyst, etc.) typically ranges from about 10 micrometers to about 500 micrometers, more typically from about 150 micrometers to about 300 micrometers.

Metallic mesh supports provide desirable thermal properties of high heat capacity and conductivity which "isothermalize" the PSA cycle to reduce temperature variations that degrade the process when conducted under more adiabatic conditions.

Metal foils are manufactured with highly accurate, thickness dimensional control. Hence there is a need for a method to coat metal foils with a thin adsorbent layer of accurately controlled thickness, with necessary good adhesion. One method for doing this is electrophoretic deposition.

The metal foil may be composed of, without limitation, aluminum, steel, nickel, stainless steel or alloys thereof. For adhesion of the electrophoretic adsorbent coating on the foil, the metal foil surface may be oxidized and preferably roughened for favorable wetting and bonding properties. An oxide coating may be applied by heating in a furnace with air or oxygen, as disclosed by Dunne (U.S. Pat. No. 5,260,243) for slip-coating zeolite slurries onto aluminum tubes. As disclosed by Chapman et al. in U.S. Pat. Nos. 4,279,782 and 4,331,631, the foil may be formed by metal peeling of an aluminum-containing, ferritic stainless steel and processed so that alumina whiskers will substantially cover the oxide film.

A preferred approach for preparing the oxide surface of an aluminum foil is by anodization under acidic conditions so as to form an alumina layer approximately 1 to 2 microns thick, with a dense hexagonal columnar array of pores regularly spaced approximately 0.2 to 1.5 microns apart. As discussed by Furneaux et al. (U.S. Pat. No. 4,687,551), pore spacing is proportional to applied voltage, and would be about 0.5 micron with an anodization voltage of 200 V. The anodic pore structure provides excellent adhesion, and can usefully act as a template for forming a desirable regular columnar orientation of macropores on the hexagonal pattern of the anodic film pores. During the electrophoretic coating process, the hexagonal template pattern perturbs the electrostatic field in the coating being formed to create a preferred distribution of porosity with the desired columnar array.

Other methods of microtexturing the base surface can be used. For example, a photolithographic mask can establish a regular pattern to similarly distort the electrostatic field in the coating under deposition. Any such technique likewise may be used to provide a template pattern for achieving deposition of the adsorbent coating with oriented macropores in that pattern and normal to the final laminate surface, thereby approaching the ideal of a non-tortuous macropore network as highly desirable for excellent mass transfer under high frequency operating conditions.

The laminate sheet may be formed upon a metal substrate whose width is equal to the length of the laminate adsorber in the flow direction within the PSA process. The substrate width also could be an integral multiple of the adsorber length, before subsequently forming the substrate to size. It is desirable that the sheet coating be applied in the direction orthogonal to the future flow direction after installation, so that any transverse coating irregularities will be distributed equally in the flow channels. After a roll of the metal foil has been coated, such as by passing continuously through an EPD bath, it may be dried and fired (if required) at a temperature of from about 150° C. to about 800° C. The roll may be cut into sheets of the appropriate size to be assembled in the laminate adsorber.

Alternatively, the laminate adsorber may be assembled from a plurality of strips to be installed orthogonal to the flow direction, and whose width is a fraction of the installed flow direction length of the laminate adsorber. Each sheet layer then consists of a plurality of separate strips. Flow channels through the adsorber will thus traverse a plurality of these strips in passing from the feed end to the product end of the adsorber. The strips may be advantageously prepared of different adsorbent materials and/or catalyst materials when the process, such as a PSA process, requires a layered adsorber with different adsorbents and/or catalysts in different zones along the length of the flow channels. For example, the adsorbent in the first strip at the feed end may be alumina or other desiccant. Adsorbent strips toward the product end may use more selective adsorbents whose function may be impaired by excessive humidity. The strips may be based on metal foil ribbons individually coated by EPD in separate baths for each adsorbent material.

VII. Methods for Forming Laminates

Generally, process rates exhibit mass transfer resistances due in part to various surface resistances. Laminates are used to minimize these resistances by (a) providing a high-surface-to-volume ratio, and (b) making a uniform minimum thickness structure supporting the active adsorbent/catalyst.

1. Coating Support Material

A. Roll Coating

Figure 2:
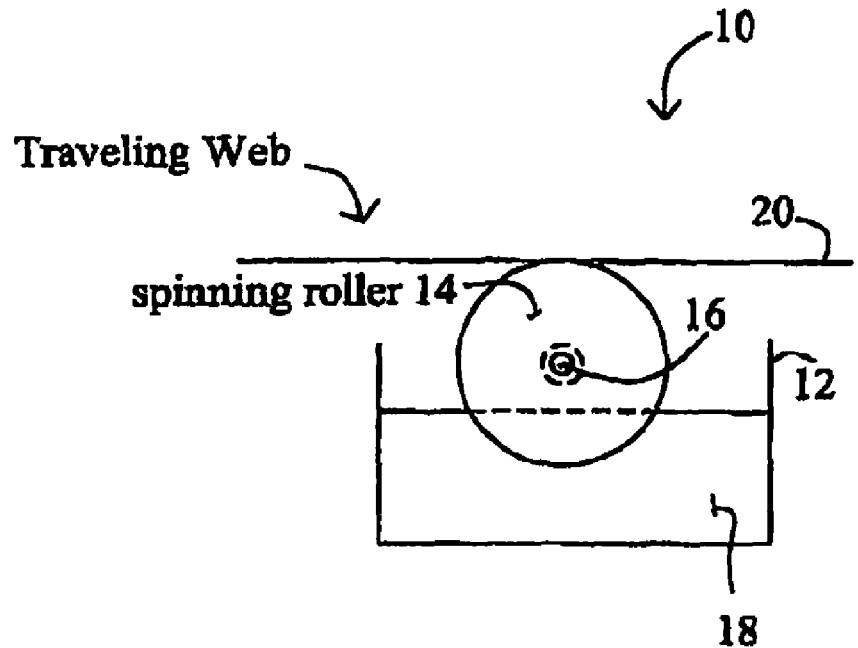
FIG. 2 illustrates a roll coater for applying slurry compositions to support material.

FIG. 2 shows a roll coater that can be used to apply disclosed slurry compositions to one or both sides of support material. With reference to FIG. 2, a coating system 10 comprises a container 12 for receiving adsorbent slurry. A roller 14 supported by, and rotating about, an axle 16 powered by a motor (not shown), is positioned so that a portion of the roller is within the slurry 18. A travelling web of support material 20 is moved across a surface 22 of the roller 14 wetted by immersion in the slurry 18. In this manner, one side of the traveling web of support material 20 is coated with the adsorbent slurry 18. If the support material 20 is porous, such as with metal mesh, fiberglass, or combinations thereof, then coating one side of the support effectively applies slurry material to both sides of the support. However, not all support materials are porous. If only one side of a non-porous support material is coated, then the uncoated side can act as a spacer for spacing coated sides one from another. Alternatively, a second side of the travelling web 20 can be coated with the same slurry material 18, or a different slurry material, by a passing the opposite side of the support material over the roller 14.

Figure 3:
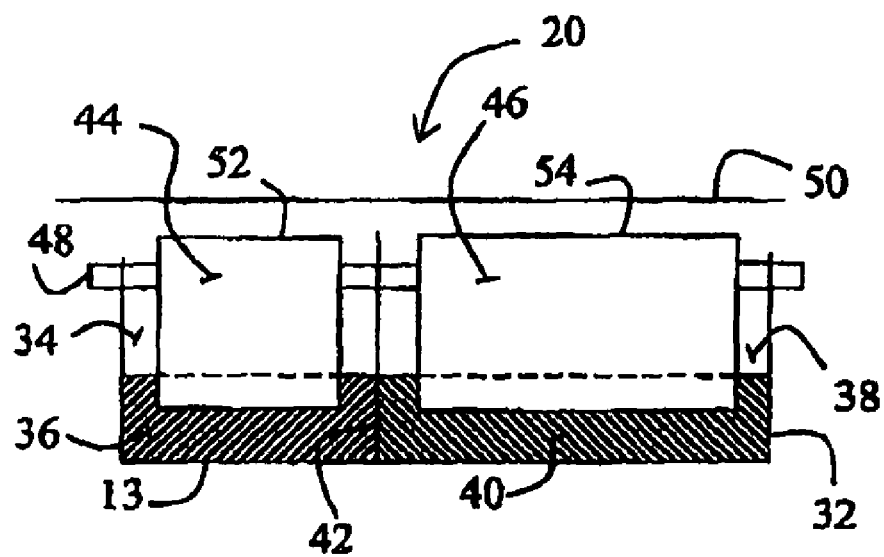
FIG. 3 illustrates a split roll coater for applying slurry compositions to support material.

FIG. 3 illustrates a split roll coater system 30 that can be used to apply different coating compositions to different sections of a support material. The illustrated embodiment of a split roll coater system 30 comprises a container 32 having a first section 34 for receiving a first adsorbent composition 36. Container 32 also includes a second section 38 for receiving a second adsorbent composition 40, which can be the same as or different from the first slurry composition 36. Generally, the split roll coater system 30 is used to apply two different slurry compositions to a support. If two different slurry compositions are used, then sections 34 and 38 are separated one from another by a wall or baffle 42 to prevent the adsorbent compositions 36 and 40 from mixing.

Positioned in section 34 is a first roller 44. Positioned in section 38 is a second roller 46. Rollers 44 and 46 can be supported, and rotated about, a common axle 48. Alternatively, the rollers 42 and 44 can be supported by and rotate about separate axles. Support material 50, such as in the form of a continuous sheet, is moved across a surface 52 and 54 of rollers 44 and 46 respectively having adsorbent compositions 36 and 40 applied thereto by rotation of the rollers through the compositions.

Figure 4:
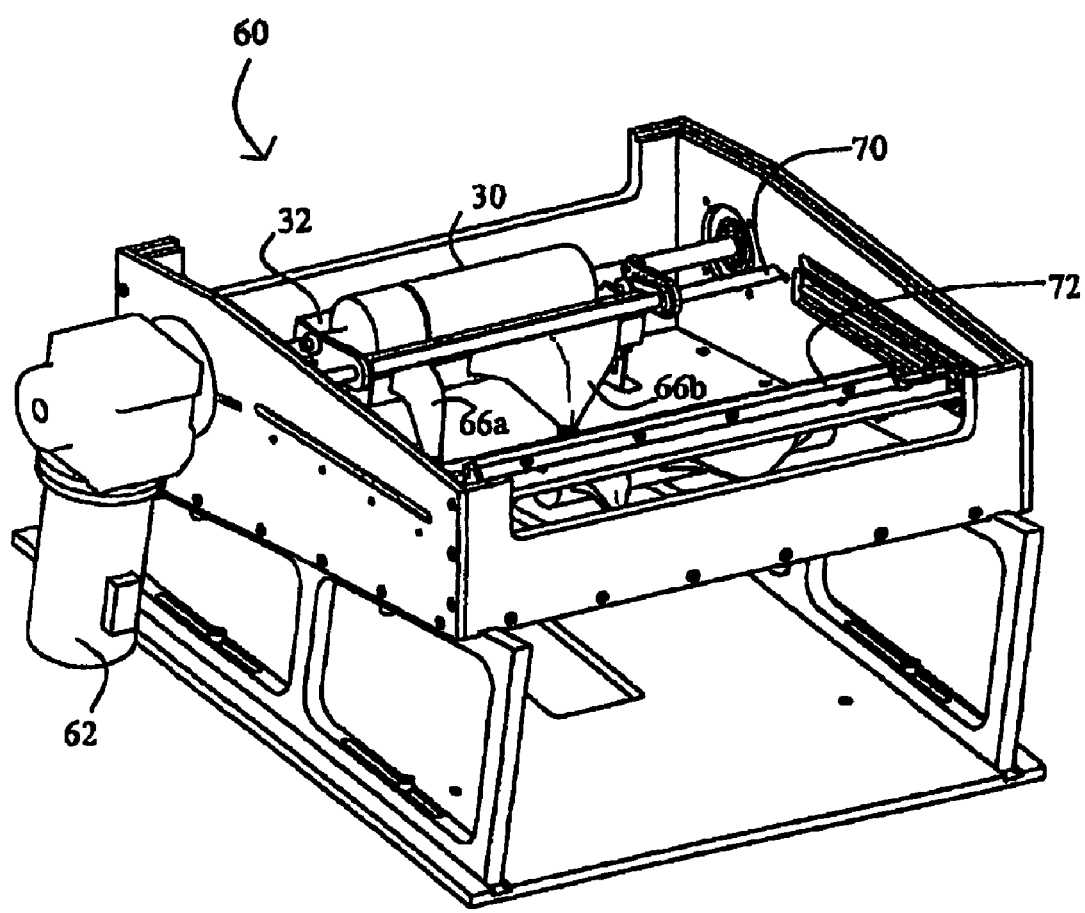
FIG. 4 illustrates one embodiment of a head box for applying slurry compositions to support material.
Figure 5:
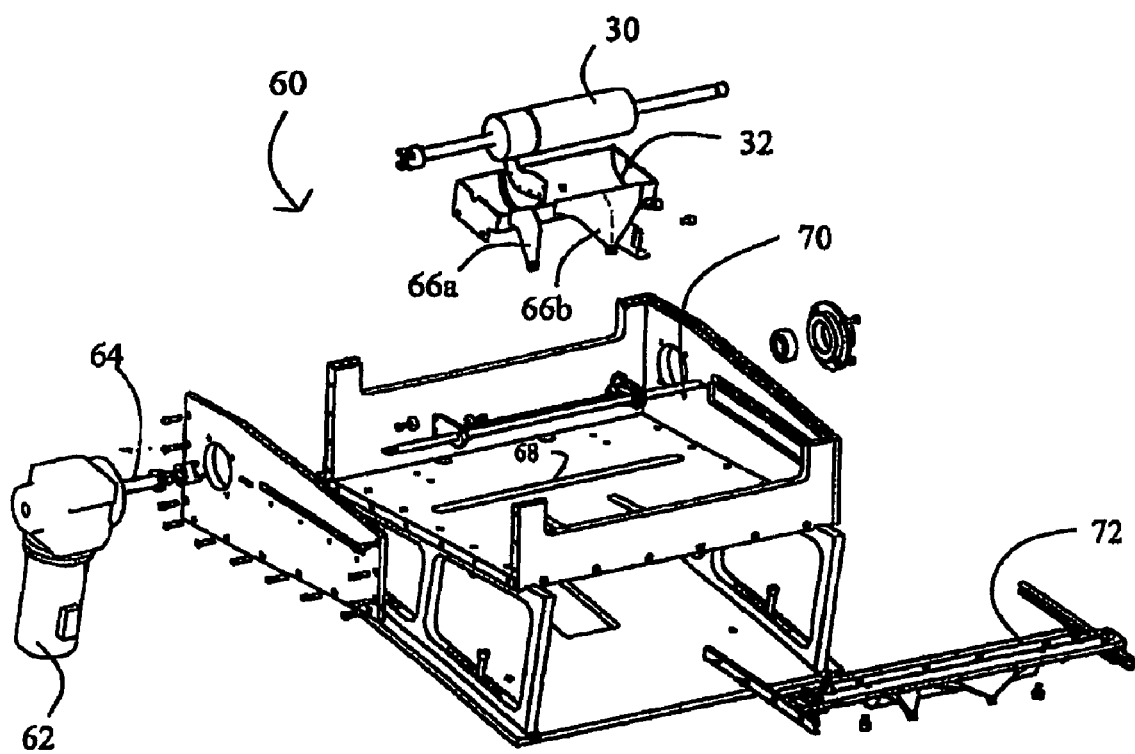
FIG. 5 is an exploded view of the head box illustrated in FIG. 4.

Adsorbent compositions can be pumped to a head box 60 for applying slurry composition to support material. FIG. 4 illustrates one embodiment of a head box 60, and FIG. 5 provides an exploded view of this head box. A travelling support material (not shown) is moved so as to contact the slurry composition, thereby coating at least one side of the support material with adsorbent composition. The illustrated head box 60 comprised a motor 62 coupled to an axle 64. Axle 64 drives a roll coater, such as the split roll coater 30 and container 32 discussed above. A pump (not shown) delivers adsorbent slurry composition to container 32. Container 32 includes overflow chambers 66a, 66b for draining slurry material from container 32 through slot 68 and into a slurry reservoir (not shown). Metering blade 70 is used to keep the amount of slurry on the roll coater 30 fairly constant. The head box 60 also includes a doctor blade 72 over which support materials passes. Doctor blade 72 is used to remove excess slurry material from the support material.

After the support is coated with adsorbent composition, it is then dried to set, and potentially cure, the composition on the support material. Drying can be accomplished by any suitable method, such as convection heating, induction heating, IR heating, microwave heating, and combinations of these methods.

B. Electrophoretic Deposition

Slurry compositions may be electrophoretically applied to the rigid support material, such as by using the method described in Bowie Keefer et al.'s prior Canadian patent application No. 2,306,311, entitled "Adsorbent Laminate Structure," filed on Apr. 20, 2000, which is incorporated herein by reference.

EPD is a technique for applying high quality coatings of uniform thickness to metal substrates. The method can be used to apply organic and inorganic particulate coatings on electrically conductive substrates. Examples of methods for electrophoretic deposition of industrial materials include Emiliani et al. (U.S. Pat. No. 5,415,748) for deposition of metallic oxide coatings; Friedman et al. (U.S. Pat. Nos. 5,591, 691, 5,604,174 and 5,795,456) for deposition of alumina catalyst support on stainless steel foils for automotive catalytic converters; and Appleby (U.S. Pat. No. 4,555,453) for deposition of molten carbonate fuel cell electrolyte and binder.

Generally, EPD involves forming a slurry in an aqueous or non-aqueous suspension, together with any appropriate organic or inorganic binders, dispersants, surfactants, defoaming agents, polyelectrolytes, etc. EPD may be conducted with the metal foil as an electrode contacting the suspension in a bath having a counterelectrode. The foil may be the cathode or anode, according to the charge of the suspended adsorbent particles respectively either positive or negative. In an aqueous EPD process, an acidic pH typically would be used for cathodic deposition, and an alkaline pH for anodic deposition.

2. Admixing Support Material with Adsorbent and/or Catalyst Slurries

Laminates can be formed by admixing support materials with disclosed slurry compositions. For example, a ceramic paper laminate can be made by first forming a weak slurry, e.g., less than 10% by weight solids, comprising: adsorbent and/or catalyst material (e.g., from about 50%-90% by weight of the solids); ceramic fiber (generally up to about 25% by weight of the solids); glass fiber (from about 2% to about 20% by weight of the solids); and colloidal silica binder (from about 2% to about 25% by weight of the solids); and any desired organic binder (up to about 10% by weight of the solids). A flocculating agent, such as cationic starch, optionally can be added to the slurry in amounts sufficient to flocculate the colloidal silica and fibers into flocs within the slurry.

The flocculated slurry is then formed into laminates. One method for forming ceramic paper-like laminates is to deposit the flocculated slurry onto a foraminous wire and then allow the composition to drain. Further drainage can be achieved using press rollers, and/or doctor blades as desired. The composition on the wire also can be drained under vacuum. The ceramic paper formed in this manner is then dried and may be pressed further using heated press rolls.

Additional setting agents can be applied to the material once deposited onto the foraminous wire. For example, reactive binders, such as sodium alginate, can be added to the slurry, and/or applied to the slurry material, such as by spraying, after it is deposited onto the wire. Setting agents can be used to initiate the reaction required to activate the binder. For example, if an alginate-based binder is used, then cationic solutions may be applied to the green paper (paper prior to the binder setting) subsequent to the application of the alginate binder.

VIII. Flow Channels and Spacers

Gas flow channels are defined in adsorber elements to allow gas flow therethrough. Generally, gas flow channels should provide for low fluid resistance coupled with relatively high surface area. Flow channel length should be sufficient to confine the mass transfer zone, which is, at least, a function of the fluid velocity, and the surface area to channel volume ratio. The channels preferably are configured to minimize pressure drop in the channels. In many embodiments, a fluid flow fraction entering a channel at the first end of the adsorber element does not communicate with any other fluid fraction entering another channel at the first end until the fractions recombine after exiting the second end. In can be recognized that channel uniformity is important to ensure that substantially all of the channels are being fully utilized, and that the mass transfer zone is substantially equally contained. The following methods for making spacer embodiments provide a method for making spacers having a set of channels, and to make the channels substantially dimensionally uniform.

Figure 26:
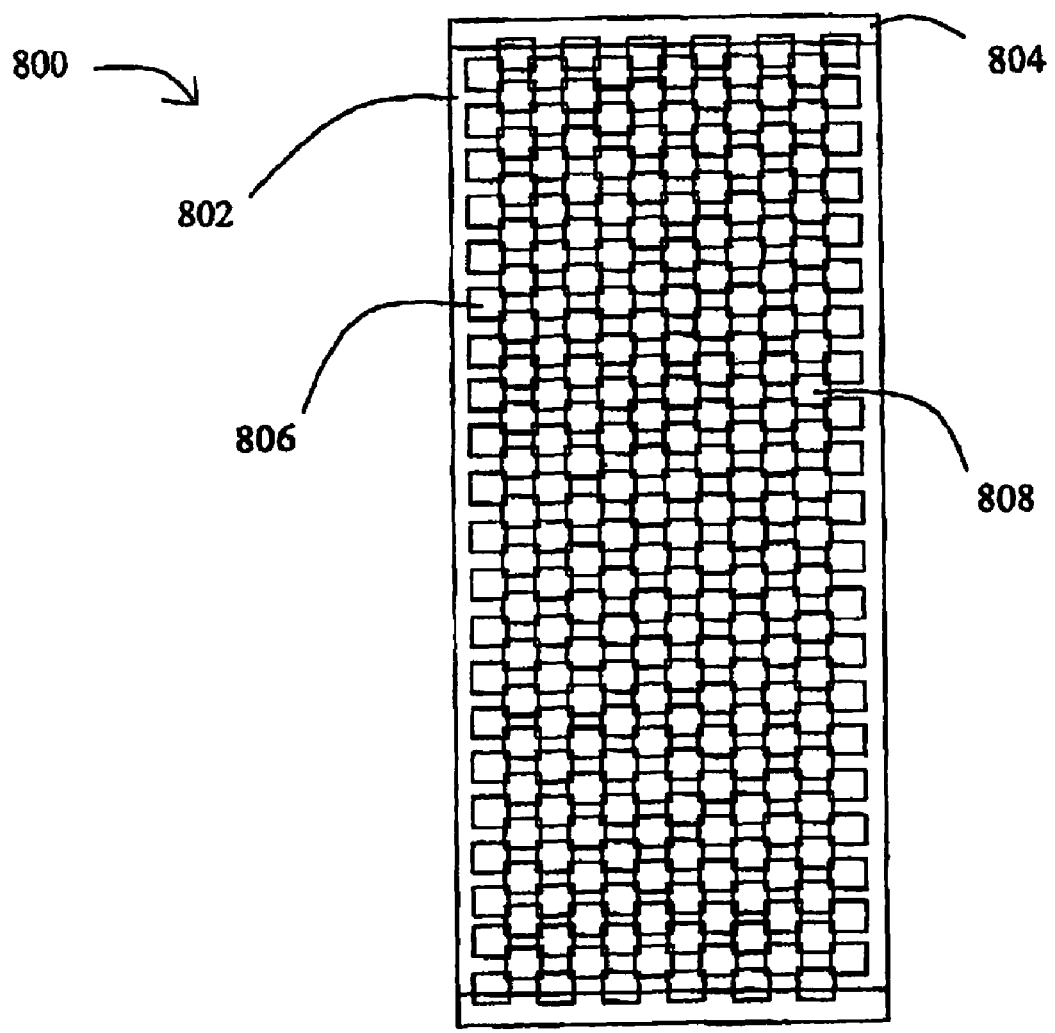
FIG. 26 is a schematic view of two adsorbent sheets having apertures therethrough and with the adsorbent sheets staggered relative to each other to define gas flow channels through the structure.

Gas flow channels can be established by placing adsorbent sheets having flow apertures therethrough adjacent one another, and then staggering the alignment of such sheets to define gas flow channels. This embodiment is illustrated by FIG. 26, which shows a structure 800 having a first adsorbent sheet 802 and a second adsorbent sheet 804 placed adjacent one another. Each adsorbent sheet 802, 804 defines apertures therethrough. The illustrated apertures are substantially square, but this is not necessary for proper operation, and instead such apertures could be any geometric shape, including without limitation, lines or slots, round apertures, rectangular apertures, etc.

The adsorbent sheets 802 and 804 are substantially identical. Adsorbent sheets 802 and 804 are positioned to define gas flow channels without the need for spacers between the adsorbent sheets. In the illustrated embodiment, sheet 802 is positioned first, and then sheet 804 is flipped over and displaced relative to sheet 802. This arrangement defines gas flow channels through the structure.

Flow channels also may be established between by spacers that form parallel channels between adjacent laminates. The channel width between adjacent adsorbent sheets of the adsorbers has been in the range of from about 25% to about 200% of the adsorbent sheet thickness. This configuration has much lower pressure drop than packed pelletized adsorbers, and avoids the fluidization problem of packed adsorbers.

Adsorbent sheets are typically in the range of from about 50 to about 400 micrometers thick, and are sufficiently compliant to accommodate stacking or rolling. Spacer systems provide the necessary stability against unrestrained deflections or distortions that degrade the uniformity of the flow channels between adjacent layers of adsorbent sheets.

Figure 6A:
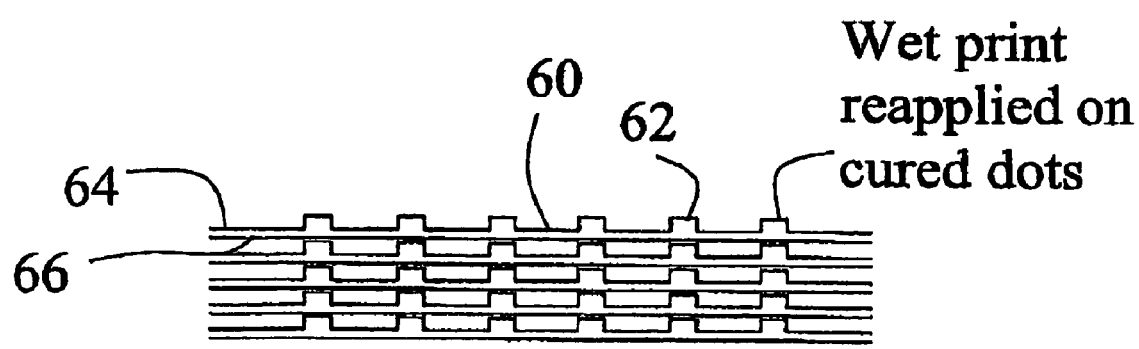
FIG. 6A is a side schematic view of plural laminate sheets positioned adjacent one another and spaced one from another by spacers.
Figure 6B:
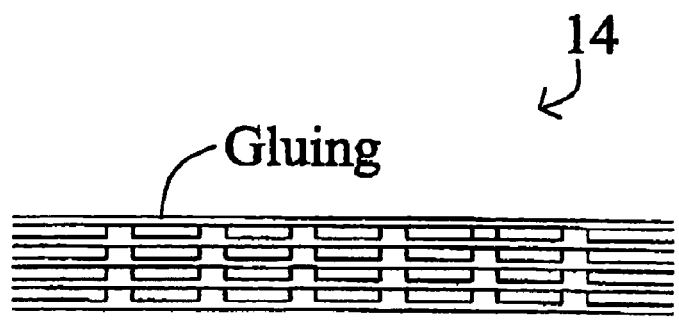
FIG. 6B illustrates an adsorber element formed from the plural laminates of FIG. 6A.

Spacers are made of any elastically deformable material, such as ceramics or metals, and may be applied to, introduced to, or otherwise made integral with the laminate sheets using any suitable method. For example, if ceramic spacers are used, the spacers may be applied to the laminate sheets by providing a certain thickness and area of a ceramic slurry to the laminate sheets and curing the slurry to form the spacers. In particular embodiments, the spacers are applied using a method similar to screen or stencil printing. A stencil is placed over the laminate sheet and the slurry is applied over the stencil, such as by pouring, brushing, screen printing (such as by using a doctor blade), or spraying. The stencil defines apertures for receiving the ceramic slurry and, when placed on the laminate sheet, these apertures form wells on top of the laminate sheet. Slurry applied to the laminate sheet collects in the wells. Thus, the spacers are positioned on a first surface of the laminate sheet by the pattern of apertures within the stencil. This is illustrated in FIG. 6 with reference to plural laminate sheets 90. When the slurry is cured, spacers 92 bond to a first surface 94 of the laminate sheet 90 as illustrated in FIG. 6a.

The spacers may be any suitable size and shape, including without limitation, round, teardrop shaped, double tear dropped, columnar, star shaped, spherical, etc. The thickness or height of the spacers determines the spacing between laminate sheets, and spacers typically range in thickness from a few micrometers to several millimeters. Particular embodiments employ spacers having a thickness of about 10 to 250 micrometers, such as about 50 to 150 micrometers. Spacers may range in width or diameter from a few micrometers to a few centimeters. In some embodiments, the widths or diameters of the spacers are in the millimeter range, such as about 1 to 10 millimeters or, generally about 2 to 8 millimeters, and typically from about 3-5 millimeters. In any particular embodiment, all spacers may be the same size, or the spacers may vary in size throughout the laminate sheet or adsorber element.

The spacers may be placed on a first surface of the laminate sheet in a random or ordered pattern. For example, the spacers may be placed in an ordered grid with substantially identical distances separating each spacer from its neighbors. Alternatively, the spacers may be placed in a series of concentric circles, a substantially linear pattern, or any other desired pattern.

If the spacers are formed on the laminate sheet using a ceramic or other slurry, the spacers are then set and/or cured, i.e., allowed to dry to form a raised structure, which can be used to separate the laminate sheets one from another. The spacers may be set and/or cured at room temperature, though heat may be applied during curing of the spacers, such as by blowing warm or hot air over the spacers, or by using IR, convection heating, inductive heating, etc. Additionally, pressure may be applied to the spacers to aid in curing, if desired.

The spacers may be modified to a particular profile, such as by shaving, roll pressing, nip rolling, calendering or abrading. If the spacers are shaved or abraded, a height guide may be used to control the shaving or abrading to provide a more uniform spacer height. For example, a second stencil of slightly lesser thickness than the stencil described above having a pattern of apertures conforming to the pattern of spacers on the laminate sheet may be placed on top of the laminate sheet. The spacers are then shaved or abraded down to the surface of the second stencil.

Spacers may be formed by embossing a raised pattern of bosses or ridges (parallel to the flow channels), so that coating over those bosses or ridges establishes the spacers. The laminate assembly must then be configured to avoid nesting of male and female indentations, for example by forming each sheet from two foils of which only one is embossed while the other remains flat. Alternatively, a raised pattern of metallic layers may be formed by electroforming or etching of the metal foil. Alternatively, a spiral laminate may be made where the spacers do not nest.

Spacers alternatively may be provided in the process by masking during part of the deposition process so as to create a raised pattern.

In alternative preferred embodiments as described below, spacers are provided as a separate fabricated assembly to be installed between laminates.

Figure 7:
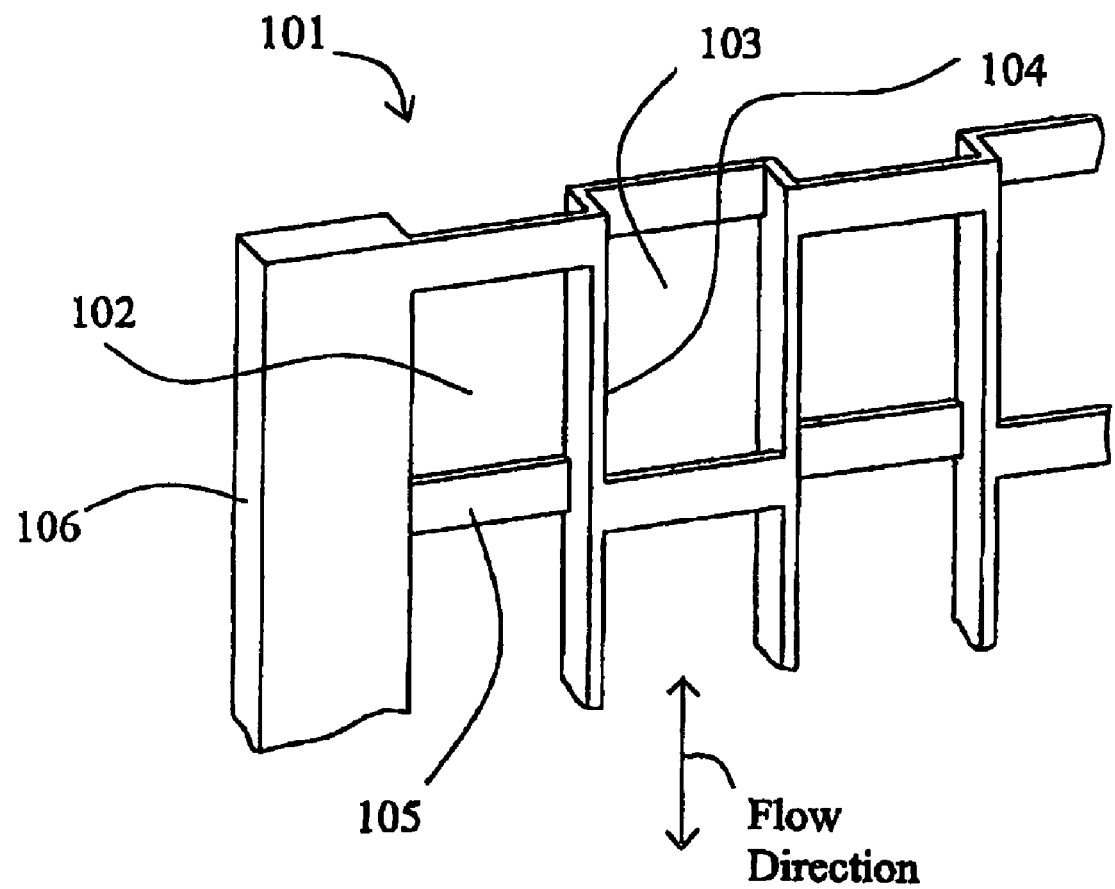
FIG. 7 illustrates a spacer formed by etching a metal foil with a photolithographic mask positioned on both sides of the foil.

FIG. 7 shows a spacer 101 formed by etching a metal foil with a photolithographic mask on both sides. Channels 102, 103 are created by through etching simultaneously from both sides to create open areas, while full thickness spacer ribs 104 between the channels are defined by the mask on both sides. Lateral struts 105 are formed at intervals by etching the struts only from one side while masked on the other side. The edge 106 of the spacer is defined by masking from both sides, with a suitable width for installation, for example by bonding in the laminate stack of alternating sheets and spacers.

Figure 8:
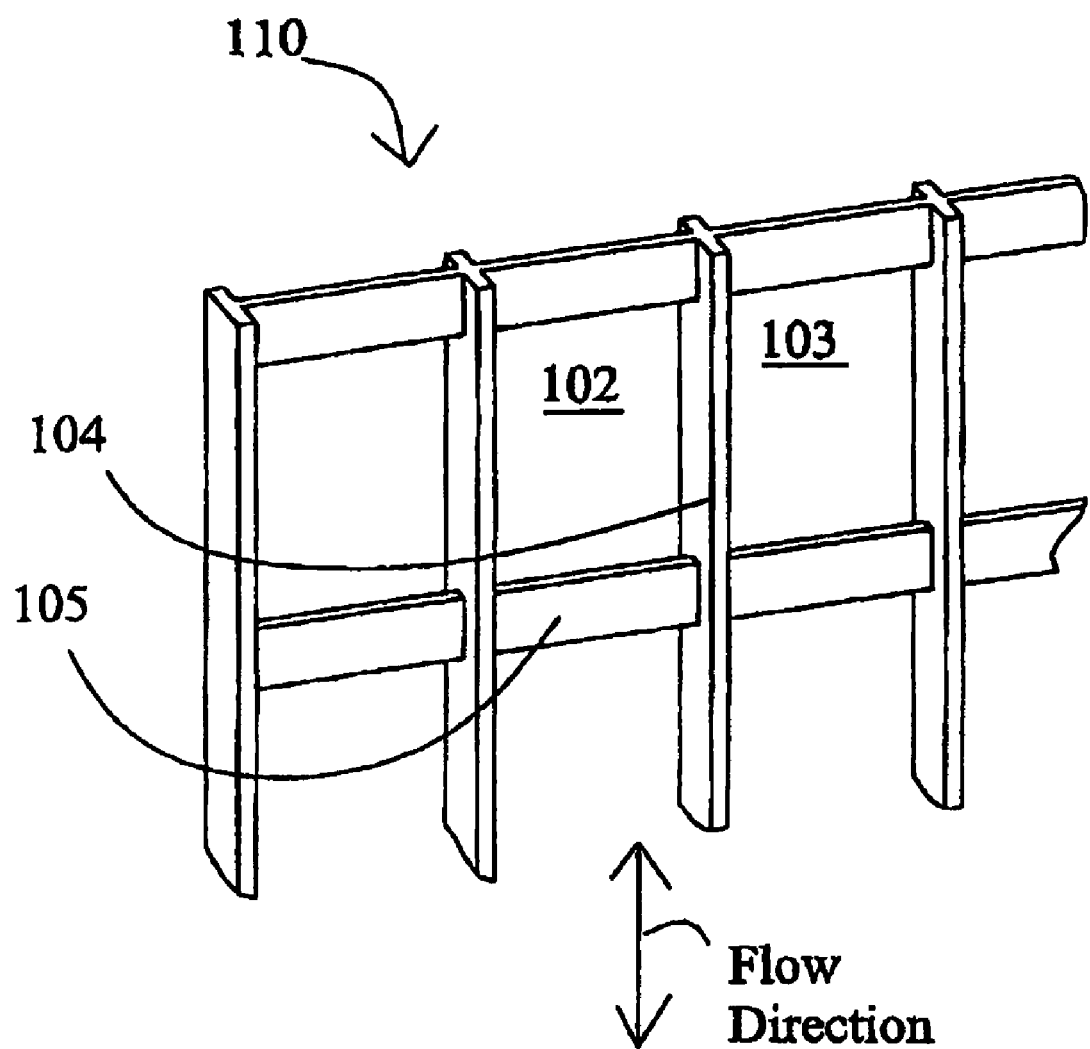
FIG. 8 illustrates a spacer.
Figure 9:
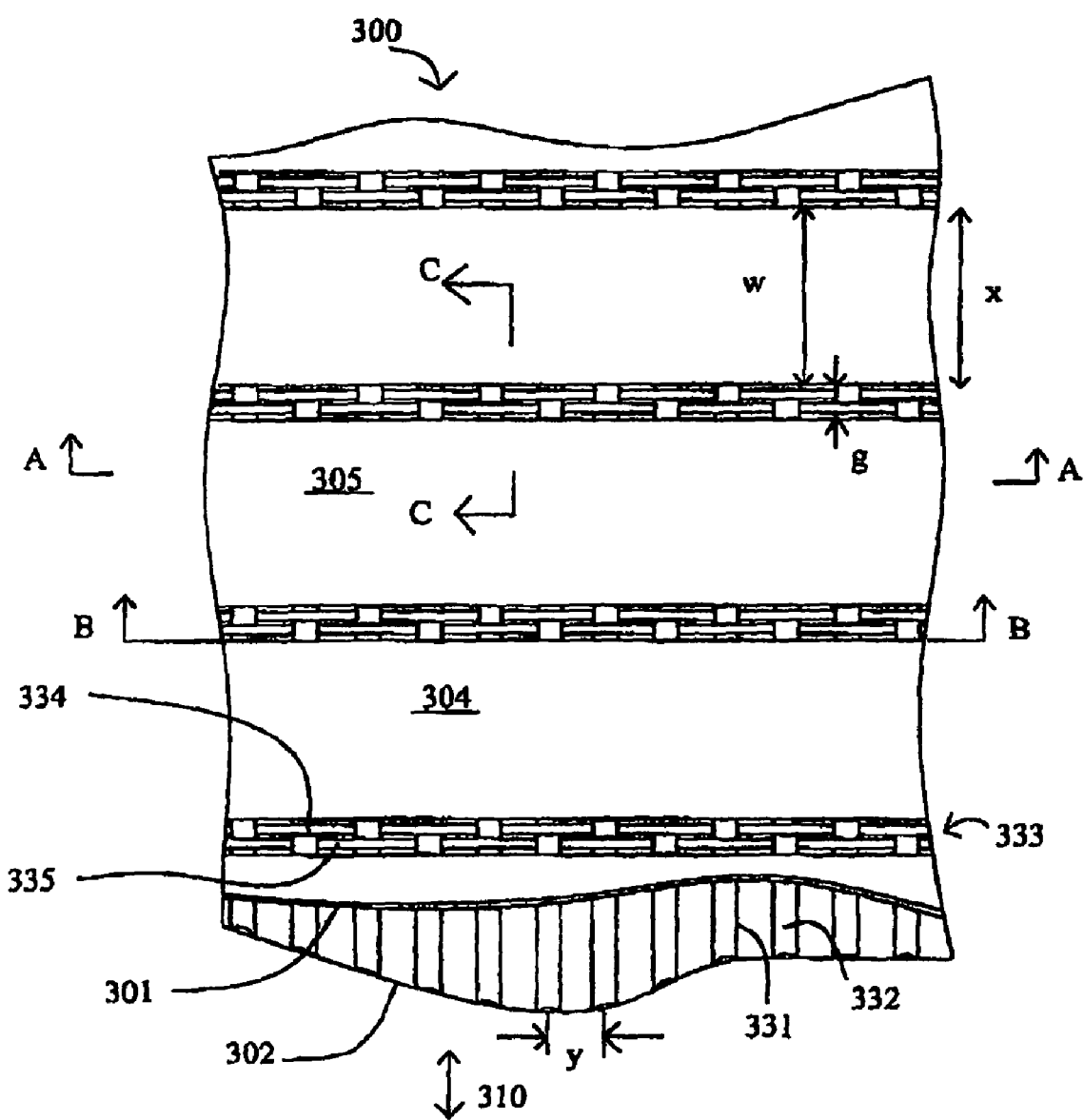
FIG. 9 illustrates a portion of an adsorbent laminate in the plane of flow channels.

FIG. 8 shows a spacer 110 which may be fabricated in several ways. For example, spacer 110 may be made (1) from metal foil by etching followed by rolling to reduce the thickness of the struts 105, (2) by diffusion bonding of thin foil strips laid across each other, or (3) by a thermoplastic molding.

FIGS. 9-12 show an adsorbent laminate structure 300. Typical sheets 301 and 302 comprise adsorbent strips, e.g. 304 and 305, made having coatings applied thereto, such as EPD coatings 306 and 307, on both sides of substrate ribbons, e.g. 308. The ribbons have a width "w" in the flow direction indicated by arrow 310.

Figure 10:
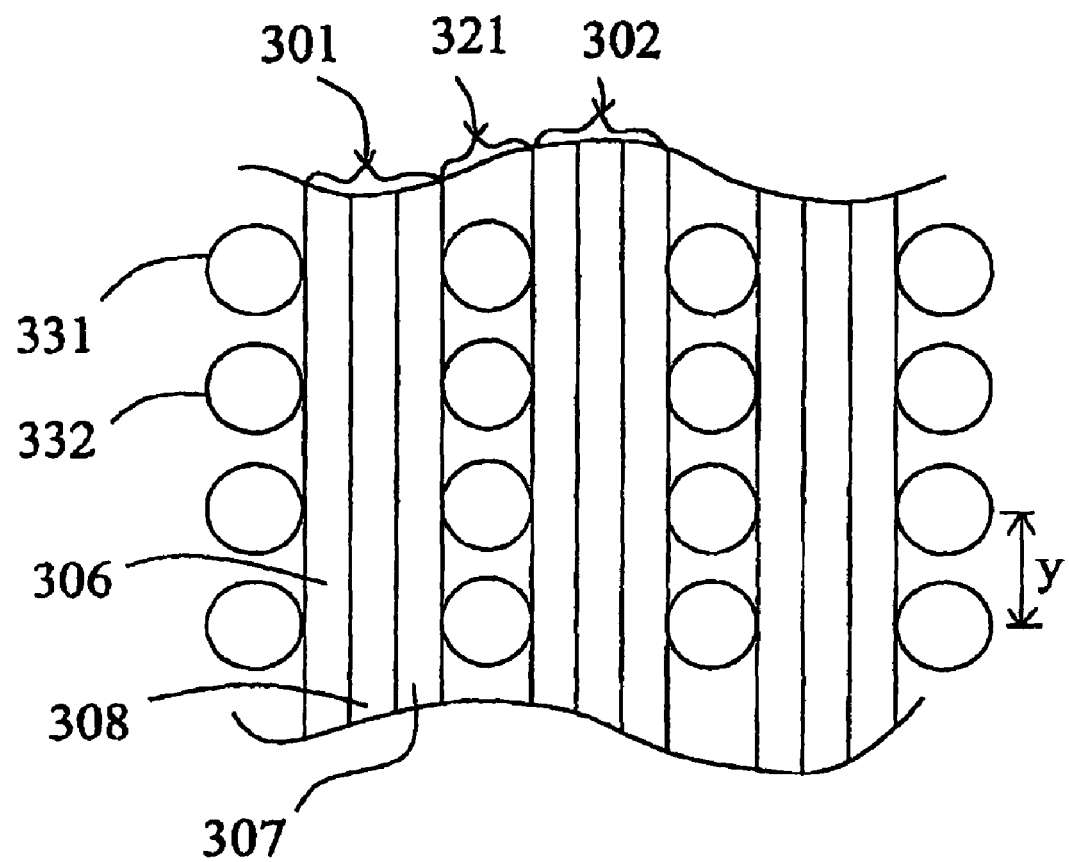
FIG. 10 is a cross section of the laminate illustrated in FIG. 9 taken along line A-A.
Figure 11:
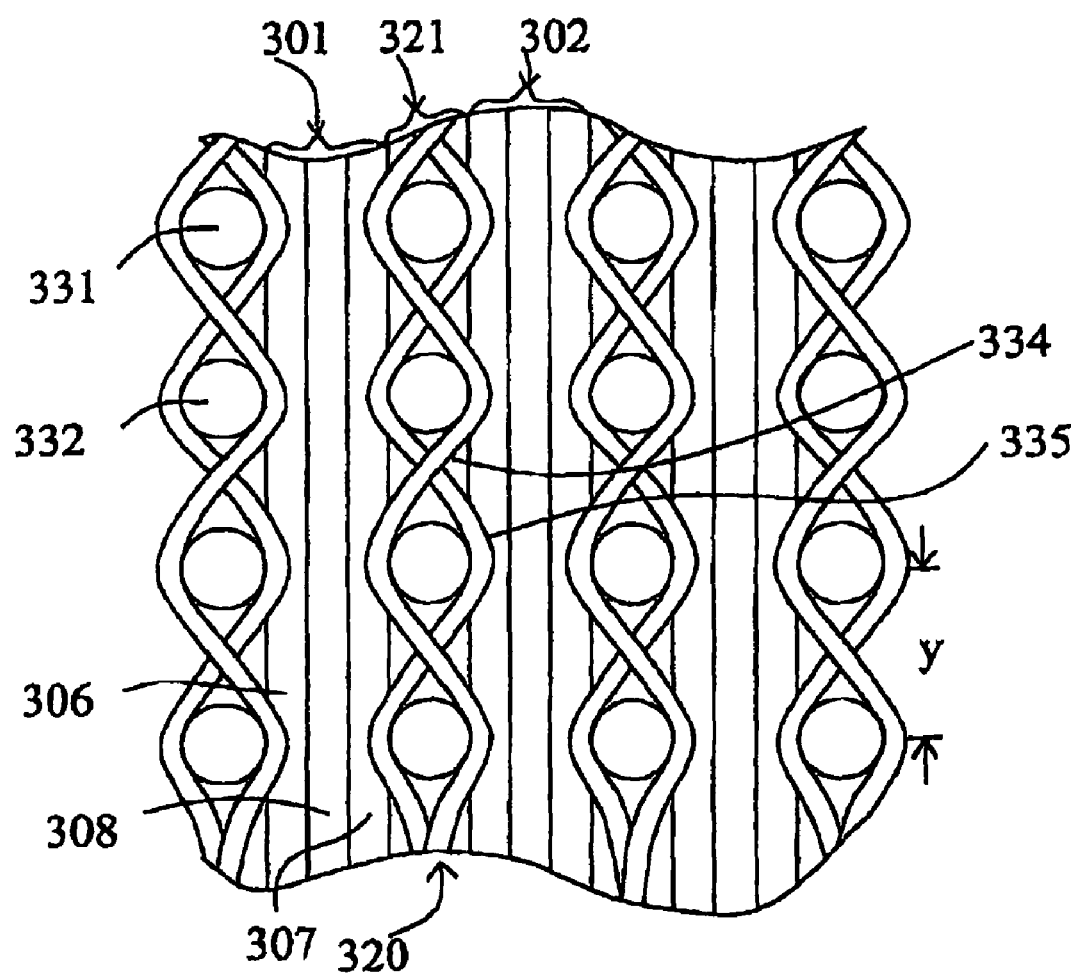
FIG. 11 is a cross section of the laminate illustrated in FIG. 9 taken along line B-B.
Figure 12:
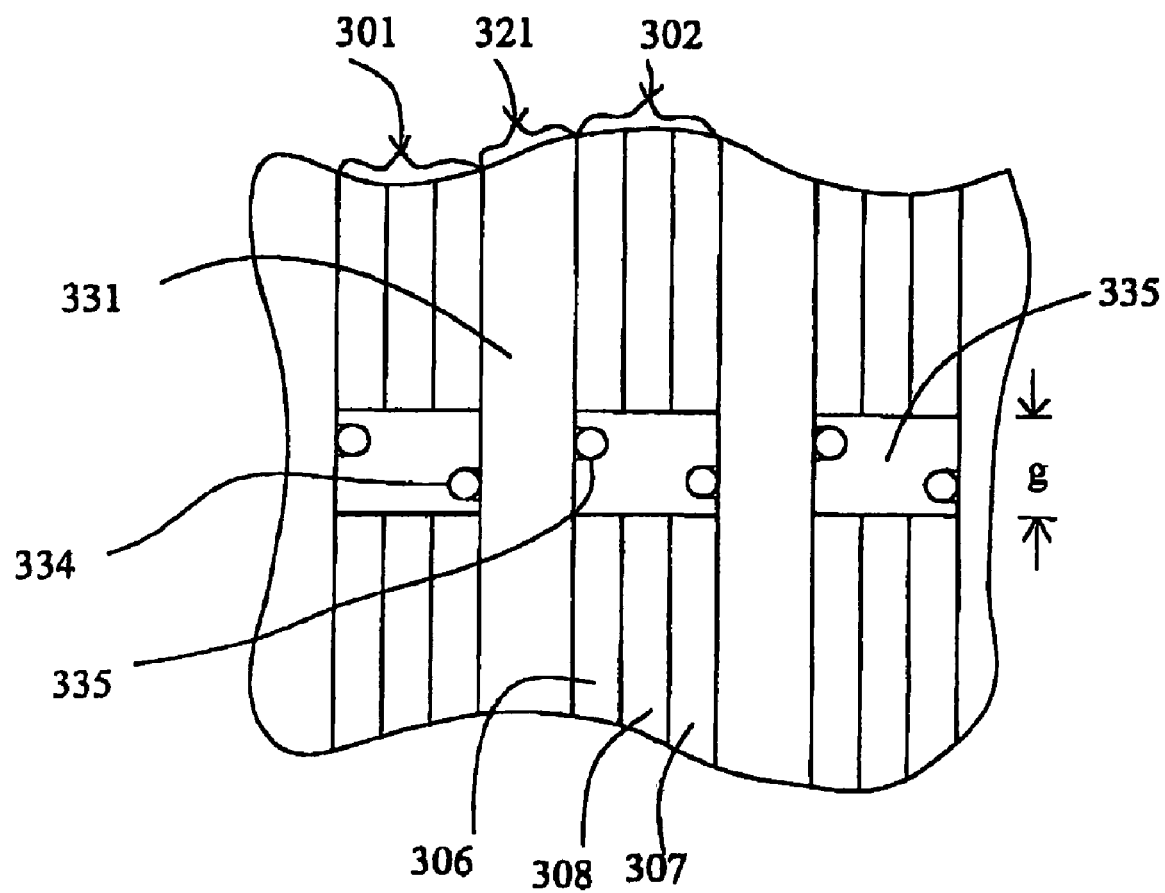
FIG. 12 is a cross section of the laminate illustrated in FIG. 9 taken along line C-C.

FIG. 10 illustrates a "woven-wire mesh spacer 320 used in each flow channel 321, between adjacent pairs of sheets 301 and 302. Each sheet in the depicted embodiment comprises multiple ribbons or strips 304 and 305, although it will be understood that the disclosed spacer 320 may be used as spacers with continuous rather than ribbon sheets. The spacer 320 comprises first and second wires. The first and second wires can have the same diameter, or can be of substantially different diameters. Various configurations of wire diameter sizes have been made, and thereafter tested in PSA apparatuses. The illustrated embodiments used wires having diameters, preferably with channel-defining wires having a larger diameter to minimize flow restrictions in the fluid flow direction. With reference to FIG. 10, spacer 320 comprises first straight, larger diameter wires e.g. 331 and 332, which are themselves the spacers. First wires 331, 332 are separated at intervals by a distance "x" and are braced and laterally spaced at equal intervals of distance "y" by a pair 333 of second wires 334 and 335 of preferably smaller diameter. The distance "x" is greater than the ribbon width "w" by a distance "g" which defines a gap 336 between adjacent ribbons along the flow path. The distance "g" is slightly more than twice the diameter of the second wires 334 and 335, so as to provide a free gap for the second wires to wrap around the first wires 331 without interference with the adsorbent ribbons. This gap 336 between each pair of ribbons also provides ventilation between all the flow channels for pressure equalization and flow redistribution to minimize channeling in the event of any flow maldistribution or tolerance deviations.

IX. Adsorber Elements

Laminate sheets may be coupled together to form adsorber elements. Disclosed embodiments have used adhesives to bond laminate sheets together. In some embodiments, the adhesive is a ceramic material, such as the same material used to produce the spacers in order to withstand subsequent high temperature operations. In such an embodiment, the ceramic material may be diluted to form the adhesive material. The adhesive may be applied to the tops of the spacers or to a laminate sheet, such as a second surface of a laminate sheet. If the adhesive is applied to the tops of the spacers, the adhesive may be applied to all of the spacers, or a suitable portion of the spacers. If adhesive is applied to a portion of the spacers, the adhesive may be applied in a random or ordered manner to a certain portion of spacers. The portion of spacers to which adhesive is applied may depend on several factors, such as the type and bonding strength of the adhesive used, the number of spacers on the laminate sheet, and the size and surface area of the spacers. If adhesive is applied to the second surface of an adjacent laminate sheet, the entire surface area of the sheet, or only some portion of that surface area, may be coated with adhesive.

Laminate sheets do not have to be bonded together using adhesives. For example, both metal mesh and spirally wound laminates may held in place by compressive force.

An adsorber element may be formed from any number of laminates, such as sheets. For example, stacked adsorber elements typically have from about 2 to about 5000 sheets, and more typically from about 50 to about 500 sheets. The sheets may be bonded to each other sequentially (i.e., the first and second sheets are bonded together to form a structure and each additional sheet is added to the structure individually) or in a group. For example, several sheets may be placed adjacent to each other and bonded together at the same time. Additionally, two or more groups of laminate sheets may be bonded together to form the adsorber element.

An exemplary adsorber element may be formed from individual laminate sheets coupled together to form a stack of sheets. This adsorber element, or brick, may be altered or machined to conform to the requirements of the end use. For example, the brick may be cut into smaller segments of any size or geometric shape. Additionally, the brick or segments may be molded.

Planar adsorbent layers can be formed as described above, either as individual, presized sheets, or capable of being cut to desired sizes and shapes. Alternatively, the adsorbent layer may be formed on a continuous sheet. Using these disclosed embodiments, various different geometries and adsorber elements can be made.

Figure 13A:
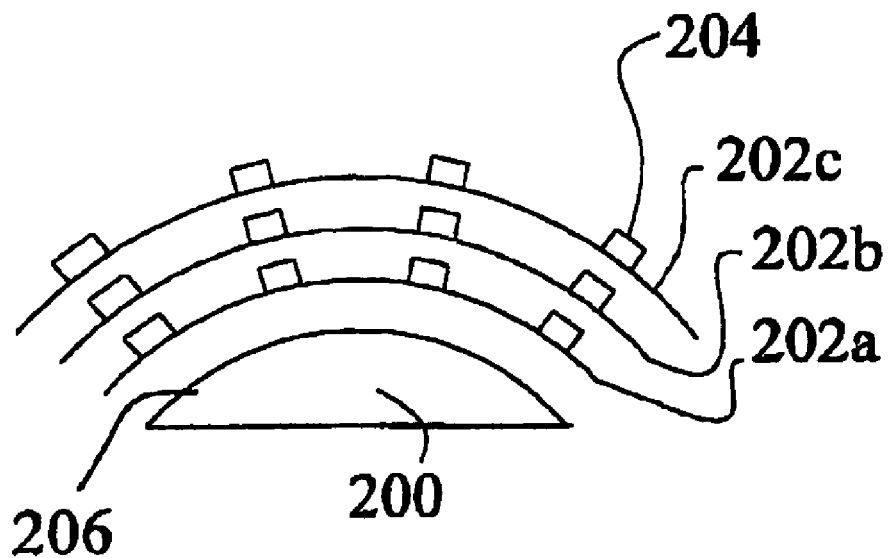
FIG. 13A is a schematic plan view of plural laminate sheets positioned adjacent one another about a mold and having plural spacers for spacing the laminate sheets one from another.

For example, FIG. 13A shows a cylindrical or round mold 200 about which, or on which, plural adsorbent sheets 202a-202c spaced by spacers 204 are molded. Molds of other shapes may be used, such as square, triangular, octagonal, oval, waveform, or other desired geometric shapes. A first such adsorbent sheet 202a having spacers 204 is placed adjacent an exterior surface 206 of the mold 200. Adhesive material is applied to all or a portion of the spacers, or on a second adsorbent sheet 202b. The second adsorbent sheet 202b is placed about the mold 200 and on top of the spacers 204 of the first adsorbent sheet 202a. This process is continued to provide as many adsorbent sheet layers as desired. An additional adsorbent sheet 207 with or without spacers 204 (FIG. 13B) may be placed about the mold on top of the entire structure.

Figure 13B:
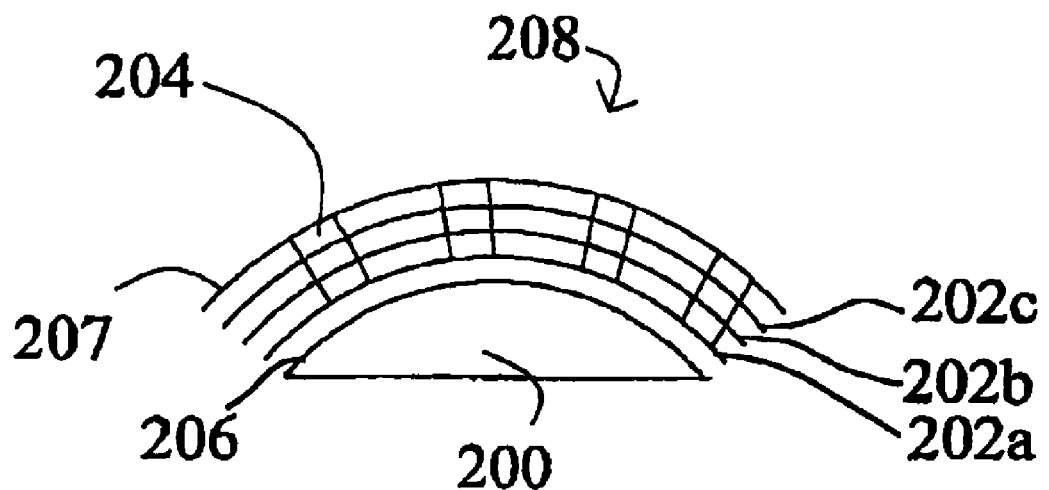
FIG. 13B illustrates an adsorber element formed from the plural laminates illustrated in FIG. 13A.

An adsorber element 208 can be formed as illustrated in FIG. 13B by placing all desired adsorbent layers in position about the mold and curing the entire structure, or serially after every layer is added to the structure, or intermittently after two or more layers are added to the structure. The setting and/or curing step may be conducted using heat.

Figure 14A:
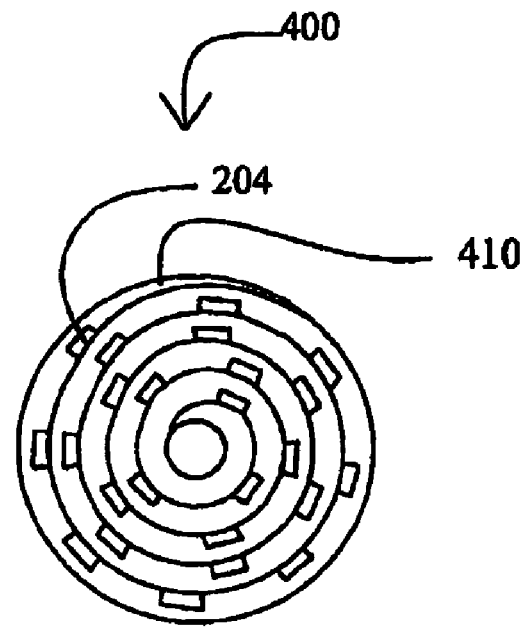
FIG. 14A is a schematic plan view of a concentrically wound, continuous adsorbent sheet having spacers placed thereon to space concentric rings of adsorbent sheets one from another.

Spiral adsorbent elements also can be formed, as illustrated in FIG. 14A. The disclosed spiral embodiment 400 was formed by spirally winding a continuous sheet 410 of support material coated with adsorbent material and having plural spacers 202 positioned thereon. Adhesive material is placed on some or all of the spacers 202, or alternatively on the sheet material 410, prior to winding the continuous sheet, and the adhesive cured. Once the spirally configured adsorber element is formed, the spacers within the structure typically are aligned one on top of another, separated by support material, on a line bisecting adjacent spirals from an exterior surface to the core. Other spacer configurations on adjacent windings also may be possible, such as plural spacers of a first winding being offset from the spacers on adjacent windings, or plural spacers forming selected spacer patterns when viewed in cross section through the spirally configured adsorber element.

Figure 14B:
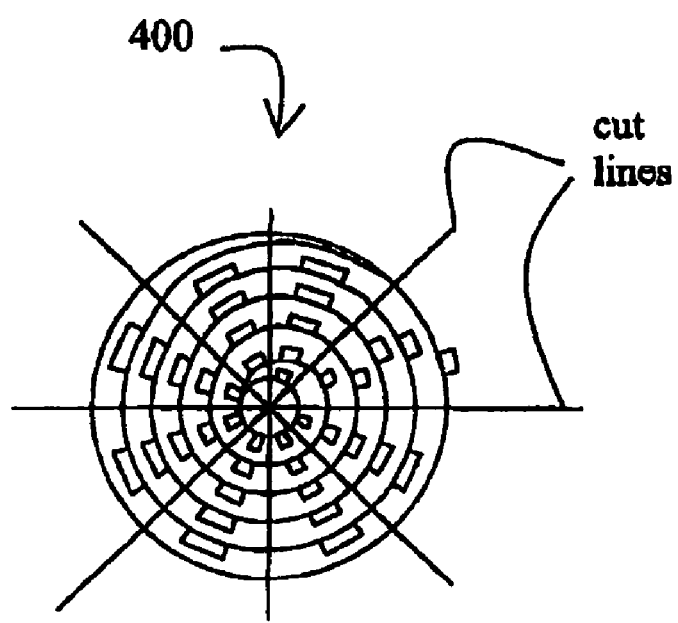
FIG. 14B illustrates sectioning an adsorber element formed by bonding a spirally wound continuous laminate sheet.

Once a spirally configured adsorber element is formed, it then can be used by itself, it can be stacked with other adsorber elements, or it can be used to form separate, multi-segmented, spirally wound microadsorbers. The spiral configuration also can be cut into other desired geometries, such as illustrated in FIG. 14B. The same effect can be accomplished by placing flow barriers on the support material. The barrier material can be the same material that is used to form the supports and/or the adhesive. To form the barriers, ceramic or other material is deposited on a line transverse to the machine direction as a continuous sheet is wrapped.

Figure 14C:
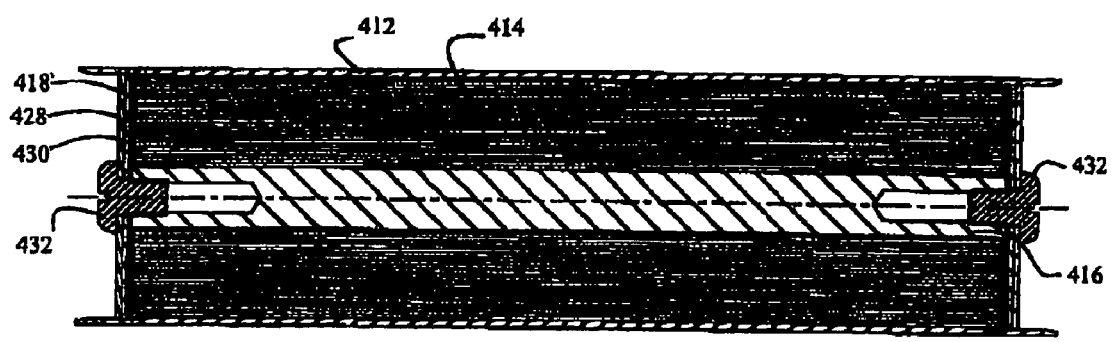
FIG. 14C is a cross-sectional view of a containment chamber for housing spirally wound laminates.

Spirally wound laminates as illustrated in FIGS. 14A and 14B typically are contained in containment chambers, such as containment chamber 412 illustrated in FIG. 14C in cross section. FIG. 14C illustrates a laminate 414 wound about a mandrel 416. Working embodiments of spirally wound laminates have been used without constraining the mandrel 416 from movement as a result of differential pressures applied to first and second ends of the laminate. The result has been mechanical degradation of the laminate, such as by abrasion of adsorbent material from the support. Mechanical degradation has been substantially eliminated by constraining movement of the mandrel 416 with the containment chamber as described with further reference to FIGS. 14C and 14D.

Working embodiments of the illustrated containment chamber 412 and mandrel 416 were made from stainless steel, but could be made from additional materials, particularly metals and metal alloys, but additional such materials as ceramics and polymeric materials. The adsorbent material used to form the laminate 414 typically are activated subsequent to insertion into the containment chamber 412. In such cases, both the containment chamber 412 and the mandrel 416 must be sufficiently robust to withstand the adsorbent activation temperature, such as temperatures of about 250° C. and greater. For adsorbent materials that can be activated at lower temperatures, the material used to form the containment chamber 412 and mandrel 416 may be other than metals, metal alloys, ceramics, etc.

Figure 14D:
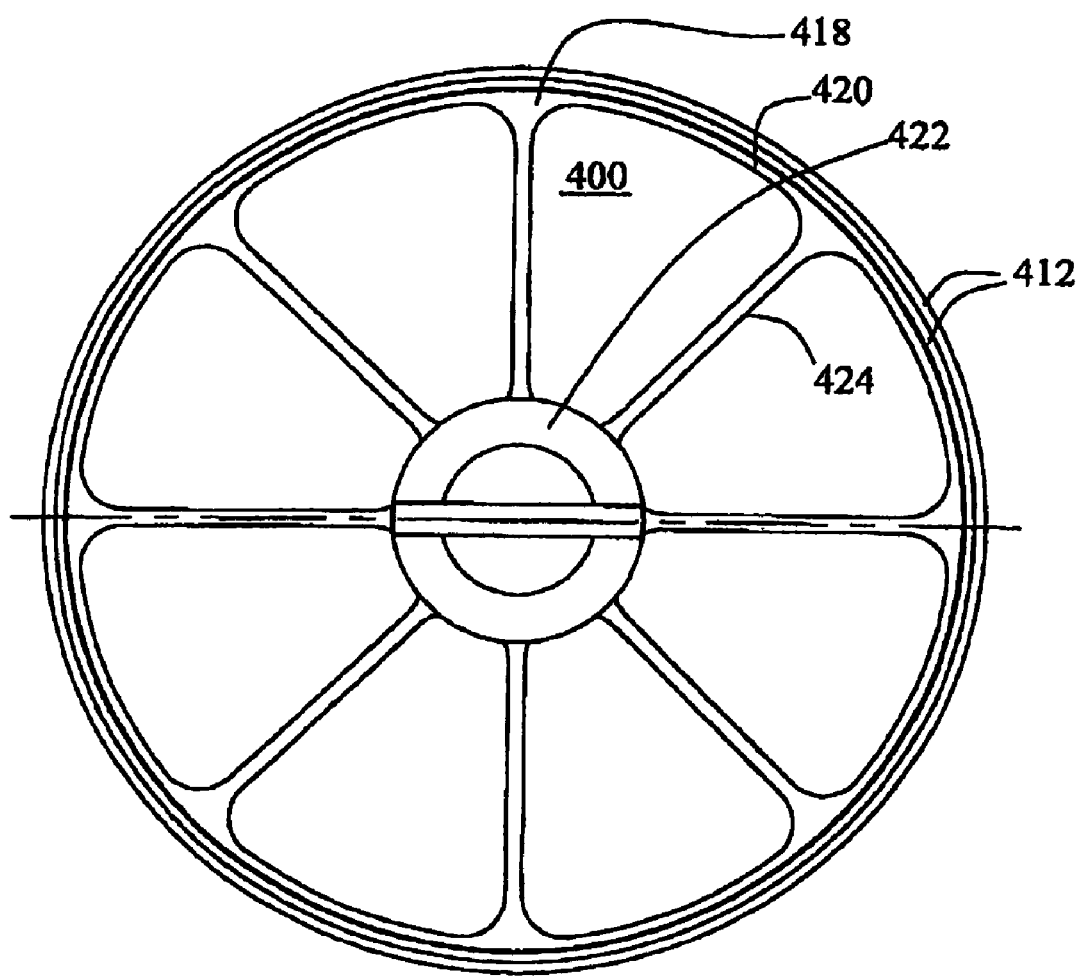
FIG. 14D is a plan view of a spider used in combination with the containment chamber illustrated in FIG. 14C.

FIG. 14C further illustrates the use of a spider 418, shown in detail in FIG. 14D. With reference to FIG. 14D, the spider 418 is a unitary device, again typically made of metal or metal alloys, such as stainless steel, having an outer ring 420 an inner ring 422 and plural spokes 424. Spokes 424 define plural flow through channels 426. Proceeding from a left side, FIG. 14C shows that the assembled laminate containment chamber 412 also includes a wire retainer disk 428 and a filter 430, such as a metal mesh filter. A fastener, such as bolt 432, is used to couple the spider 418, a wire retainer disk 428 and filter 430 to the mandrel 416. Retainer disk 428 and filter 430 are optional, and the spider 418 can be used alone. The illustrated embodiment includes a threaded mandrel 416, which receives bolt 432 to secure these components to the mandrel. In the illustrated embodiment, both ends of the containment chamber 412 are identically configured to have spiders 418, wire retainer disks 428 and filters 430. Alternatively, a single spider could be used on one end of the device, or plural spirally wound laminates could be contained in a containment chamber with one or more spiders being located between the spirally wound laminates to prevent axial movement. As still another embodiment, a spirally wound laminate or laminates could be placed into a containment chamber, and then a substantially uniform concentric compressive force applied to the containment chamber to deform it about the laminate or laminates to prevent axial movement of windings. To further prevent movement of the laminate and to prevent gas flow out of the containment chamber 412, a bead of material (not illustrated), such as a ceramic material, may be placed about the inner circumference of the containment chamber. Other methods of fastening can be used, such as a shoulder built into chamber 412 (not illustrated). The filter rings 428 then contact this bead when the containment chamber is assembled.

Persons of ordinary skill in the art will realize that different containment methods can be used in combination with spirally wound laminates. For example, differently configured spiders can be used. Any such structure which supports a spiral laminate and mandrel to prevent relative axial movement of one and preferably both, and which allows for fluid flow distribution throughout the laminate, is suitable.

Figure 15A:
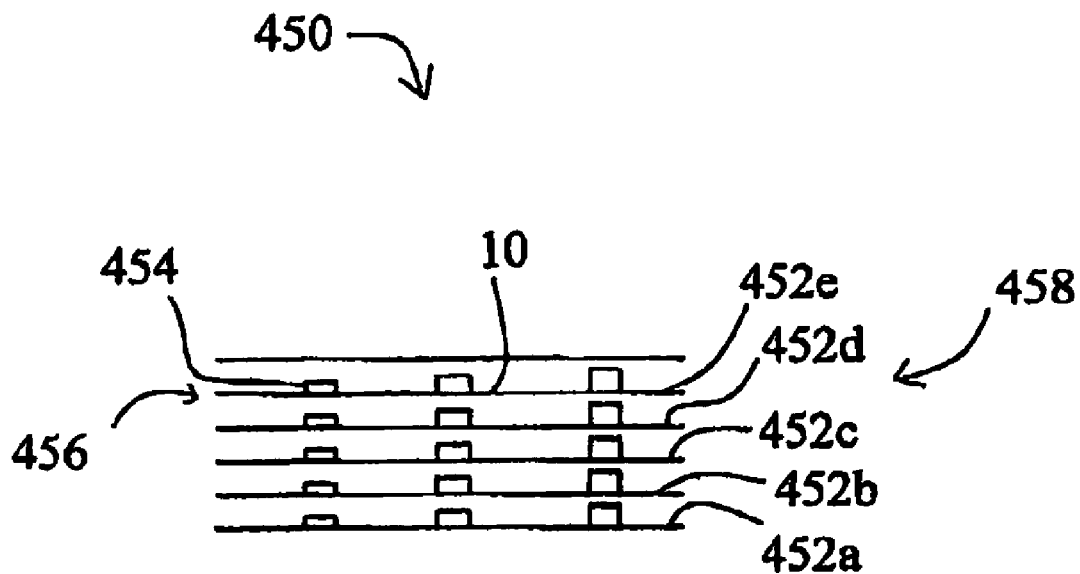
FIG. 15A is a schematic side view of plural laminate sheets having spacers therebetween of decreasing height in the direction of gas flow.
Figure 15B:
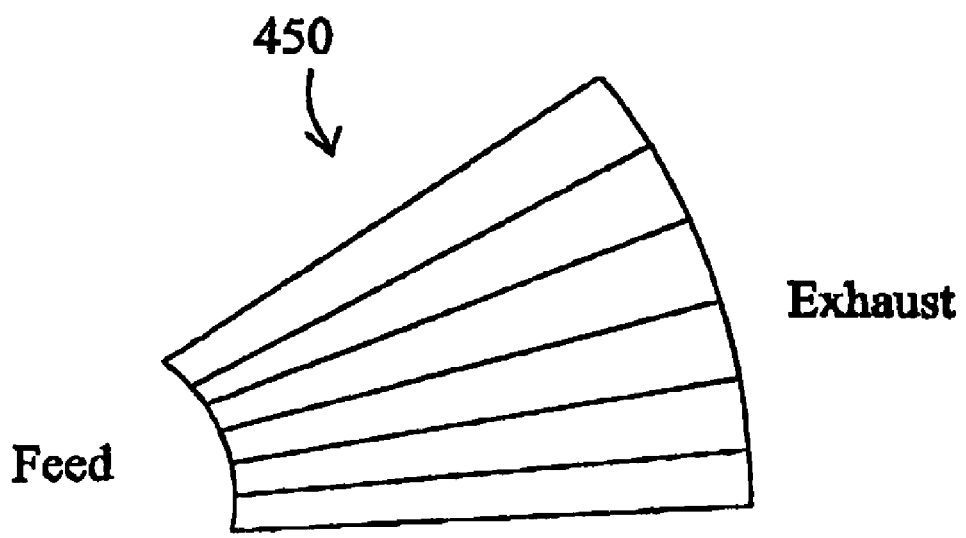
FIG. 15B illustrates a radial adsorber element formed by bonding together the plural laminate sheets of FIG. 15A.

FIGS. 15A and 15B show still another embodiment 450 of an adsorber element that can be formed by positioning plural laminate sheets 452a-452e adjacent one another in a stack. Each of the sheets 452 includes plural spacers 454 adhered to a surface thereof. In contrast to other disclosed embodiments however, the spacers 454 do not have a uniform height. Instead, the spacer height increases from a first end 456 of a sheet 452 to a second end 458 of the sheet. Plural such sheets 452 are then stacked and bonded as with other disclosed embodiments, i.e., by placing adhesive on some or all of the spacers 454, or by placing adhesive on some or all of a portion of the bottom surface of the sheets 452. The stack is then bonded together to form a radially extending adsorber element as illustrated in FIG. 15B (spacers not shown). Feed gas typically is introduced into the PSA device housing the adsorber element to the adsorbent layers adjacent the second and of the support layers, i.e., that region where the spacers have the greatest height. Product is then withdrawn from the first end.

In some applications, such as reactor or PSA apparatuses placed on board a vehicle, vibration and shock loadings are much more frequent and severe than in stationary commercial applications. The use of laminates and spacers provide a structure that is more robust than a beaded or pelletized packed adsorber, and hence, provide additional benefits beyond size, weight, cost and pressure drop.

X. Ventilation Apertures

Figure 16:
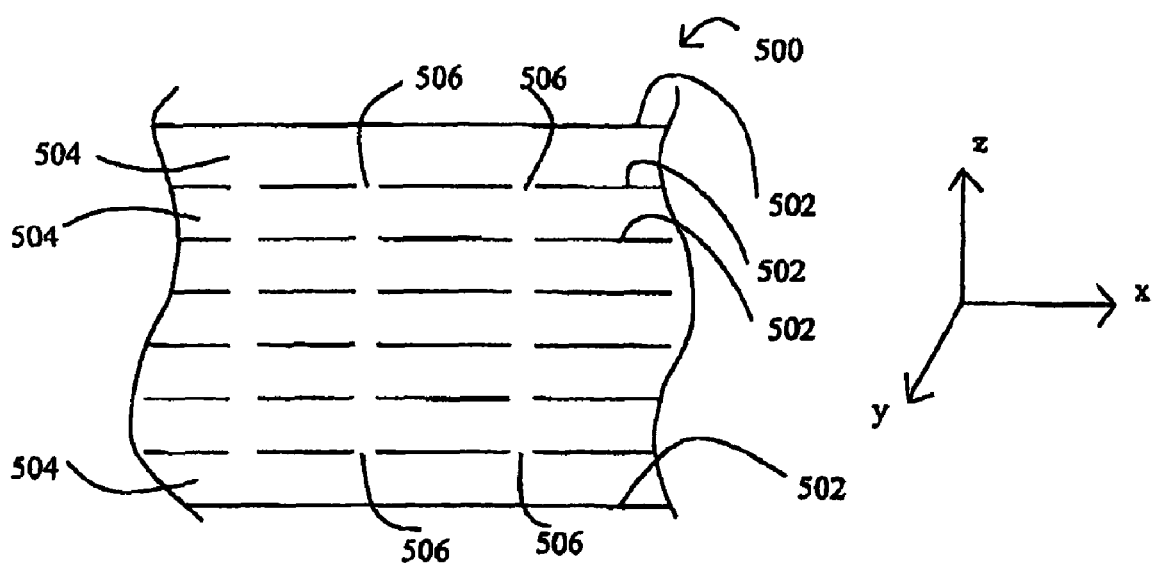
FIG. 16 is a cross sectional side view of a section of an adsorbent structure according to the invention showing ventilation apertures defined in the adsorbent sheets.
Figure 17:
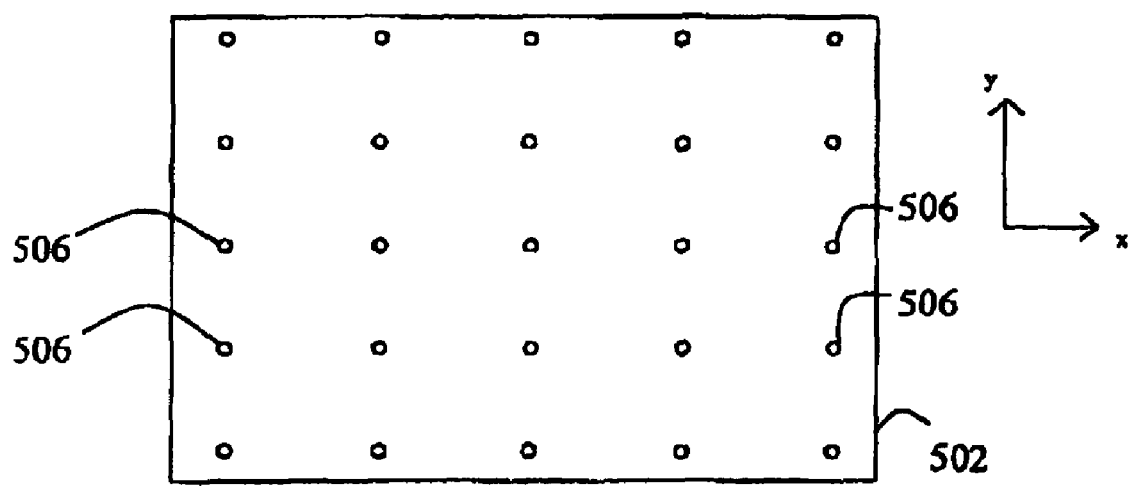
FIG. 17 is a top view of one adsorbent sheet illustrated by FIG. 16 having ventilation apertures formed therethrough.

FIGS. 16 and 17 illustrate an adsorber element 500 comprising a plurality of laminates 502. Laminates 502 are separated, such as by spacers (not shown), to form flow channels 504 between adjacent laminates. Defined in adsorber element 500 are plural ventilation apertures 506 that permit fluid communication between flow channels 504. As a gas mixture is caused to flow through flow channels 504 in either the X or Y direction, at least a portion of the gas mixture may flow through ventilation apertures 506 in the Z direction if there is a pressure or concentration differential across the flow channels. Such flow in the Z direction enhances flow mixing and equalizes pressure, constituent concentration, and flow fronts through the adsorber element 500. It has been found that an adsorbent structure having ventilation apertures that allow gas flow between flow channels results in increased productivity and recovery in gas adsorption separation compared to an adsorbent structure without such apertures. Ventilation apertures can be random or aligned in a particular direction, such as the Z direction, or staggered. In working embodiments, apertures aligned in the Z direction provide significantly improved results relative to embodiments without ventilation apertures.

The amount of ventilation apertures used for a particular embodiment can be stated with reference to the amount of surface area of a particular structure that is ventilation apertures. Ventilation apertures likely are only required because the physical structure of an adsorber element is not sufficiently controlled to prevent pressure and concentration differences to occur. In a perfect system, no ventilation apertures would be used, and hence the ventilation aperture area would be 0%. However, perfect systems are not readily achieved, if at all. Ventilation apertures are used to reduce the process requirements of substantially identical channels. As a result, the total area of apertures 506 for certain disclosed embodiments was desirably about 1 percent to about 3 percent of the total area of a laminate. The apertures may be equally spaced and aligned in the X and Y direction, or alternatively, the apertures 506 may be arranged in a staggered pattern. It also should be understood that there is no requirement as to the arrangement of apertures 506.

The apertures 506 may be formed in the laminate 502 by any suitable method. For example, apertures 506 may be formed by drilling or punching holes into the laminate 502. Alternatively, where a laminate 502 is formed by applying a slurry of adsorbent material to a support, apertures 506 may be formed by blowing holes through the adsorbent sheet with compressed fluid. Templates can be used to form the apertures.

Two or more separate adsorber elements can be positioned to provide adsorber elements in series along a flow path.

XI. Activating Laminates and/or Adsorber Elements

Laminates and adsorber elements produced as described above may need to undergo additional processing prior to use. For example, the laminates may be heated to volatilize nonessential volatile materials. Examples of heating methods include convection, induction, microwaves, IR, vacuum assisted heating, etc. Continuous processes have been developed whereby a continuous sheet of material is transported through a continuous oven. The laminate may be subjected to a ramped heating schedule to avoid thermal damage by vaporized nonessential materials. Often, using a purge gas to transport materials as they are released from the adsorbent materials also facilitates the process.

XII. Examples

The following examples are provided to exemplify certain features of working embodiments of the present invention. The scope of the present invention should not be limited to those features exemplified.

Example 1

This example concerns the effects that ventilation apertures have on laminates made according to the present invention. Apertures were formed in laminates made as described herein. The overall area of the apertures is expressed as a percentage of the area of the laminate. These laminates were tested in a reciprocating PSA apparatus and compared to intact laminates, i.e., laminates without apertures, under the same operating conditions, such as feed and exhaust pressures. The results are discussed below.

Figure 18:
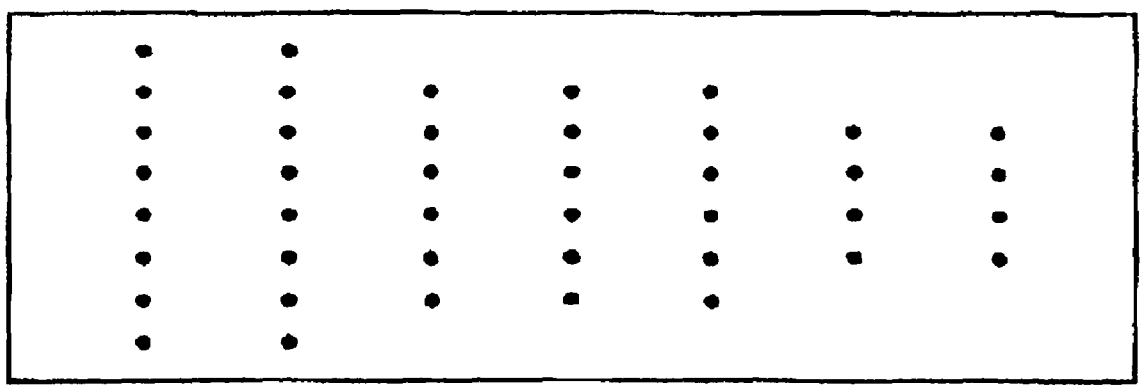
FIG. 18 is a top plan view of an embodiment of a template used to make laminates having ventilation apertures according to the invention.

FIG. 18 is a schematic drawing of one example of a template used to make the apertured laminates discussed below.

Tables 3 (control) and 4 (laminates with apertures) present data concerning recovery (%) versus normalized productivity (volume/volume/hour) at 90% oxygen purity and compares the results of rectangular laminates made as described herein having ventilation apertures made by blowing holes through the laminate with compressed air versus laminates without ventilation apertures. The control had a spacer/substrate thickness of 0.66, whereas the spacer/substrate thickness of the apertured laminate was about 0.68. Tables 3 and 4 show that the productivity at a particular recovery was increased for apertured sheets versus adsorbent sheets without ventilation apertures.

TABLE 3

Control Without Apertures

| CPM | RECOVERY (%) | FRACTIONAL PRODUCTIVITY |
|---|---|---|
| 30 | 63.2 | 0.45 |
| 125 | 41.3 | 1.00 |

TABLE 4

Laminate With Apertures

| CPM | RECOVERY (%) | FRACTIONAL PRODUCTIVITY |
|---|---|---|
| 30 | 66.8 | 0.48 |
| 125 | 41.3 | 1.00 |

Tables 5-7 provide data for recovery versus productivity at 90% oxygen purity for rectangular laminates having random and aligned ventilation apertures made by blowing holes through the laminates with compressed air compared to a control without ventilation apertures. The laminates with apertures had a total ventilation aperture area of about 0.99%. Tables 5-7 indicate that ventilation apertures aligned in the Z direction significantly improve the recovery and productivity relative to a control at the same cycles per minute.

TABLE 5

Control With No Apertures

| CPM | RECOVERY (%) | FRACTIONAL PRODUCTIVITY |
|---|---|---|
| 30 | 70.5 | 0.487 |
| 125 | 39.4 | .999 |

TABLE 6

Laminate With Random Apertures

| CPM | RECOVERY (%) | FRACTIONAL PRODUCTIVITY |
|---|---|---|
| 30 | 69.3 | 0.476 |
| 125 | 40.3 | .984 |

TABLE 7

Laminate with Apertures Aligned in Z Direction

| CPM | RECOVERY (%) | FRACTIONAL PRODUCTIVITY |
|---|---|---|
| 30 | 73.1 | 0.461 |
| 125 | 45.1 | 1.00 |

Tables 8-10 provide performance data at 90% oxygen purity for heavily loaded fibre glass laminates having ventilation apertures that were either aligned in the z direction and staggered in the y direction or aligned in both the z and y directions compared to a control without ventilation apertures. The laminates with apertures had a total ventilation aperture area of about 0.97%. Tables 8-10 show that the productivity at a particular recovery was decreased for laminates having apertures versus laminates without ventilation apertures.

TABLE 8

Control With No Apertures

| CPM | RECOVERY (%) | FRACTIONAL PRODUCTIVITY |
|---|---|---|
| 30 | 58.5 | 0.662 |
| 125 | 34.6 | 1.00 |

TABLE 9

Laminate With Apertures Aligned in Y Direction

| CPM | RECOVERY (%) | FRACTIONAL PRODUCTIVITY |
|---|---|---|
| 30 | 58.8 | 0.663 |
| 125 | 33.9 | .943 |

TABLE 10

Laminate with Apertures Staggered in Y Direction

| CPM | RECOVERY (%) | FRACTIONAL PRODUCTIVITY |
|---|---|---|
| 30 | 58.0 | 0.647 |
| 125 | 34.1 | .959 |

Tables 11-15 provide performance data at 90% oxygen purity for fibre glass laminates having ventilation apertures compared to a control without ventilation apertures. The laminates with ventilation apertures were stacked in four different ways, z direction aligned, z direction staggered, z direction aligned with every other laminates without ventilation apertures, and z direction staggered with every other laminate without ventilation apertures.

Tables 11-15 provide data for recovery versus productivity for the aforementioned laminates with ventilation apertures compared to a control without ventilation apertures. Tables 11-15 show that the productivity at a particular recovery was decreased for laminates with apertures that were aligned in the z direction and were interspersed with every other sheet being a sheet without ventilation apertures. The other laminate combinations had increased productivity at a particular recovery versus laminates without ventilation apertures.

Similar trends were seen at 70% oxygen purity.

TABLE 11

Control With No Apertures

| CPM | RECOVERY (%) | FRACTIONAL PRODUCTIVITY |
|---|---|---|
| 30 | 69.7 | 0.635 |
| 90 | 60.3 | .981 |

TABLE 12

Laminate With Apertures Aligned in Z Direction

| CPM | RECOVERY (%) | FRACTIONAL PRODUCTIVITY |
|---|---|---|
| 30 | 76.3 | 0.598 |
| 90 | 64.6 | .931 |

TABLE 13

Laminate with Apertures Staggered in Z Direction

| CPM | RECOVERY (%) | FRACTIONAL PRODUCTIVITY |
|---|---|---|
| 30 | 78.8 | 0.572 |
| 90 | 65.4 | .888 |

TABLE 14

Laminate With Interspersed Apertures Aligned in Z Direction

| CPM | RECOVERY (%) | FRACTIONAL PRODUCTIVITY |
|---|---|---|
| 30 | 70.3 | 0.652 |
| 90 | 59.7 | .983 |

TABLE 15

Laminate with Interspersed Apertures Staggered in Z Direction

| CPM | RECOVERY (%) | FRACTIONAL PRODUCTIVITY |
|---|---|---|
| 30 | 69.2 | 0.657 |
| 90 | 60.0 | 1.000 |

Example 2

This example concerns an adsorbent laminate and the results obtained using such pack as provided below in Table 16. A rectangular adsorbent pack was made using methods as described herein. The rectangular pack included activated alumina dessicant and a lithium-exchanged zeolite applied to a fiber glass substrate. In contrast to Example 1, printed spacers having a height of 125 micrometers were used instead of metal mesh spacers. This pack was tested as a single pack on a stationary bed, rotary valve testing apparatus with a feed pressure of between about 3 and 11 psig operating at the cycle speeds stated in Table 16.

TABLE 16

| CPM | $O_2$ Purity (%) | Recovery (%) | Productivity (v/v · hour) |
|---|---|---|---|
| 30 | 90 | 38.2 | 773 |
| 148 | 90 | 34.7 | 1943 |

The rectangular pack of this example experienced about half the pressure drop compared to other laminate configurations. Moreover, using printed spacers instead of wire mesh spacers decreases the weight of the pack and provides a significant cost decrease. Printed spacers also allow the formation of bonded packs instead of non-bonded packs made using metal mesh spacers. Bonded packs can be formed, and then cut into any desired shape, and also are easier to manipulate compared to nonbonded packs.

Example 3

This example concerns an adsorbent laminate and the results obtained using such pack for hydrogen purification as presented in Table 17. A spirally wound adsorbent pack was made using methods described herein. The spirally wound pack included activated alumina (AA), 3X zeolite, and SZ5 zeolite. Both a mesh substrate and mesh spacers were used to make the pack. An apparatus having 8 beds of this spirally wound pack were then tested simultaneously on a rotary bed testing apparatus capable of providing light product reflux. The feed pressure was about 100 psig. The results of this study using a feed gas composition of syngas having about 75% $H_2$ are provided below in Table 17. Standard industry performance has recovery values of between approximately 75% to about 85%, with productivity values of approximately 150 v/v·hour.

TABLE 17

| CPM (cycles per minute) | $H_2$ Purity (%) | CO Concentration (PPM) | Recovery (%) | Productivity (v/v · hour) |
|---|---|---|---|---|
| 30 | 99.9 | 100 | 69.4 | 3982 |
| 81 | 99 | 100 | 58.5 | 9273 |

Examples 1-3 illustrate that packs of various geometric configurations can be made, including without limitation, trapezoidal, rectangular and spirally wound structures. Various substrates, for example fiber glass and metal materials, can be used, to which an adsorbent or adsorbents and/or desiccants can be applied to form the laminates. Spacers can be made using a variety of methods, including metal mesh spacers, and printed spacers, and pack performance maintained. Such packs can be used for various gas separation procedures, such as oxygen and hydrogen purification. Packs can be manufactured primarily for use at relatively low pressures, such as the described trapezoidal and rectangular packs, or for high pressure applications, such as the spirally wound pack described in Example 3, which are contained within a casing allowing for higher pressure applications. Any of the described packs can be used alone, or in combination with multiple packs, either of the same configuration or of differing configurations, or can be used for ambient or relatively low temperatures, or at relatively high temperatures.

XIII. Exemplary PSA Apparatuses

Figure 19:
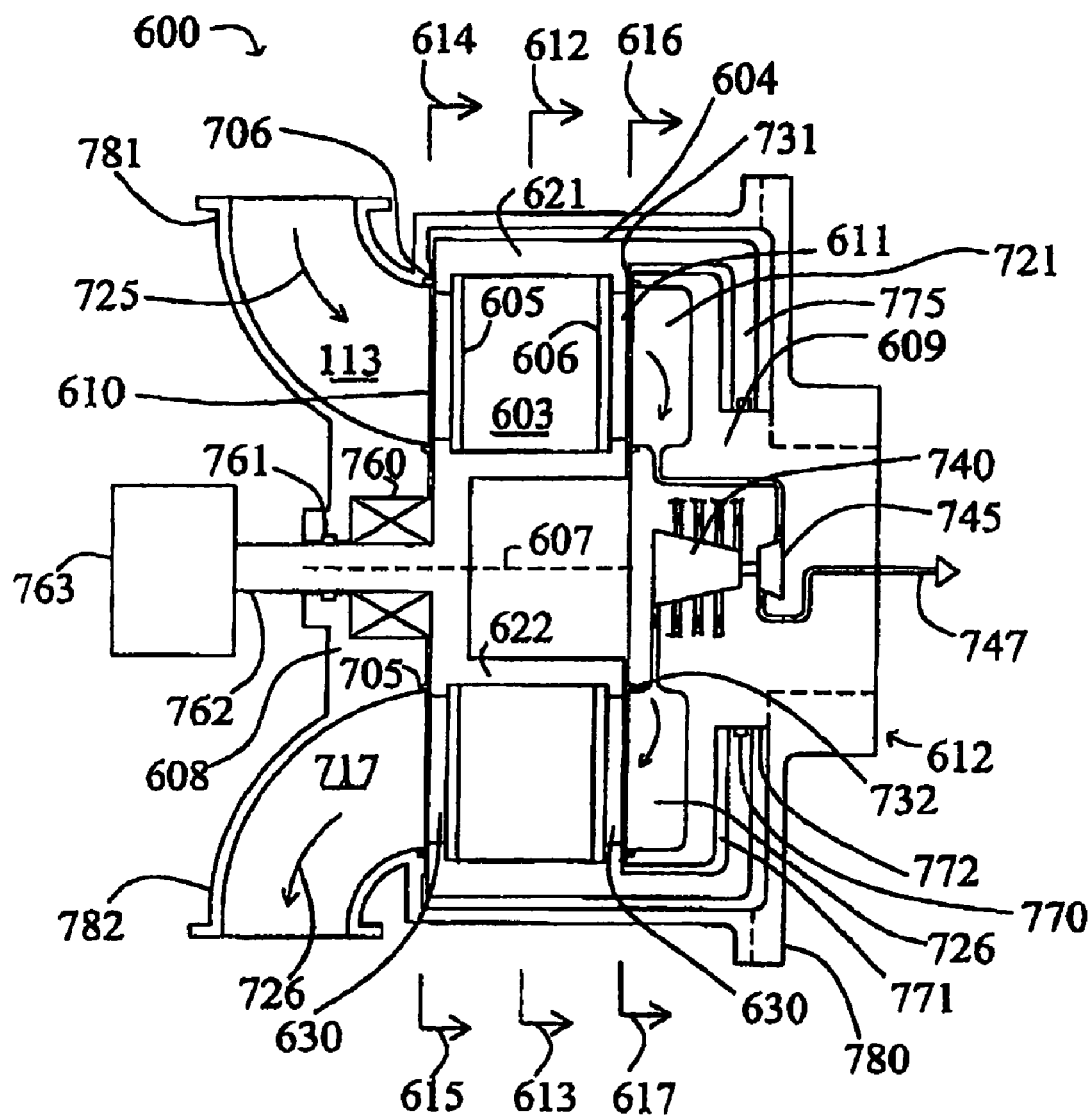
FIG. 19 is a schematic view of a rotary pressure swing adsorption apparatus particularly suitable for small-scale oxygen generation.

The laminates/adsorber elements described herein can be used advantageously with pressure swing adsorption devices. An example of a suitable PSA device is illustrated in FIGS. 26-30. FIG. 19 shows a rotary PSA module 600, particularly suitable for smaller scale oxygen generation. Module 600 includes a number "N" of adsorber elements 602 in an adsorber housing body 604.

Each adsorber element 602 has a first end 606 and a second end 608, with a flow path there between contacting an adsorbent, such as a nitrogen-selective adsorbent. The adsorber elements 602 are deployed in an axisymmetric array about axis 607 of the adsorber housing body. The housing body 604 is capable of relative rotary motion about axis 607 with first and second functional bodies 608 and 609, being engaged across a first valve face 610 with the first functional body 608 to which feed air is supplied and from which nitrogen-enriched air is withdrawn as the heavy product, and across a second valve face 611 with the second functional body 609 from which oxygen-enriched air is withdrawn as the light product.

In disclosed embodiments depicted in FIGS. 19-25, the adsorber housing 604 rotates and shall henceforth be referred to as the adsorber rotor 604, while the first and second functional bodies are stationary and together constitute a stator assembly 612 of the module. The first functional body shall henceforth be referred to as the first valve stator 608, and the second functional body shall henceforth be referred to as the second valve stator 609.

In the embodiment shown in FIGS. 19-25, the flow path through the adsorber elements is parallel to axis 607, so that the flow direction is axial. The first and second valve faces are shown as flat annular discs normal to axis 607. More generally the flow direction in the adsorber elements 603 may be axial or radial, and the first and second valve faces may be any figure of revolution centred on axis 607. The steps of the process and the functional compartments to be defined will be in the same angular relationship regardless of a radial or axial flow direction in the adsorbers.

FIGS. 20-25 are cross sections of module 601 in the planes defined by arrows 612-613, 614-615, and 616-617. Arrow 620 in each section shows the direction of rotation of the rotor 604.

Figure 20:
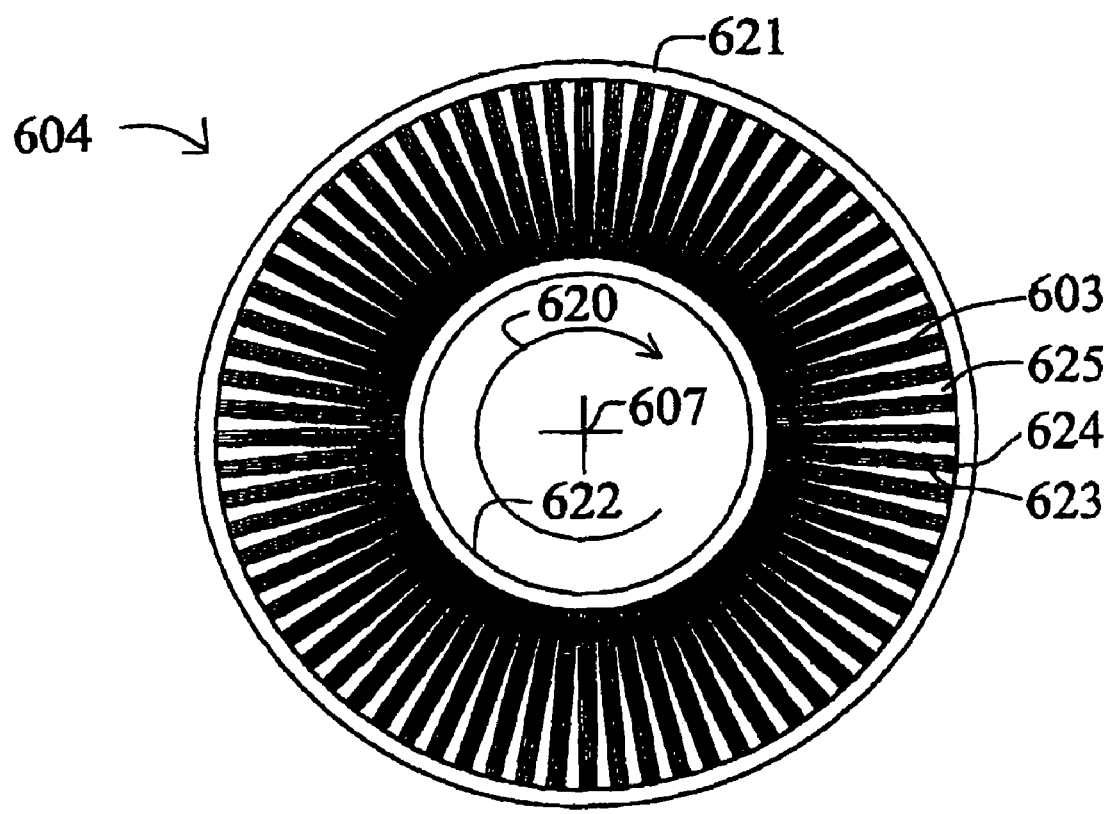
FIG. 20 is a cross section of the apparatus illustrated in FIG. 26 taken along line 612-613.

FIG. 20 shows section 612-613 of FIG. 19, which crosses the adsorber rotor. Here, "N"=72. The adsorber elements 603 are mounted between outer wall 621 and inner wall 622 of adsorber wheel 808. Each adsorber comprises a rectangular flat pack 603 of adsorbent sheets 623, with spacers 624 between the sheets to define flow channels in the axial direction. Separators 625 are provided between the adsorbers to fill void space and prevent leakage between the adsorbers. The adsorbent sheets comprise a reinforcement material as discussed herein. For air separation to produce enriched oxygen, typical adsorbents are X, A or chabazite type zeolites, typically exchanged with lithium, calcium, strontium, magnesium and/or other cations, and with optimized silicon/aluminum ratios. The zeolite crystals are bound with silica, clay and other binders, or self-bound, within the adsorbent sheet matrix.

For working embodiments sheet thicknesses have been about 150 microns, with spacer heights in the range of from about 10 to about 300 microns, more typically from about 75 to about 175 microns, and adsorber flow channel length approximately 20 cm. Using X type zeolites, excellent performance has been achieved in oxygen separation from air at PSA cycle frequencies in the range of 30 to 150 cycles per minute.

Figure 21:
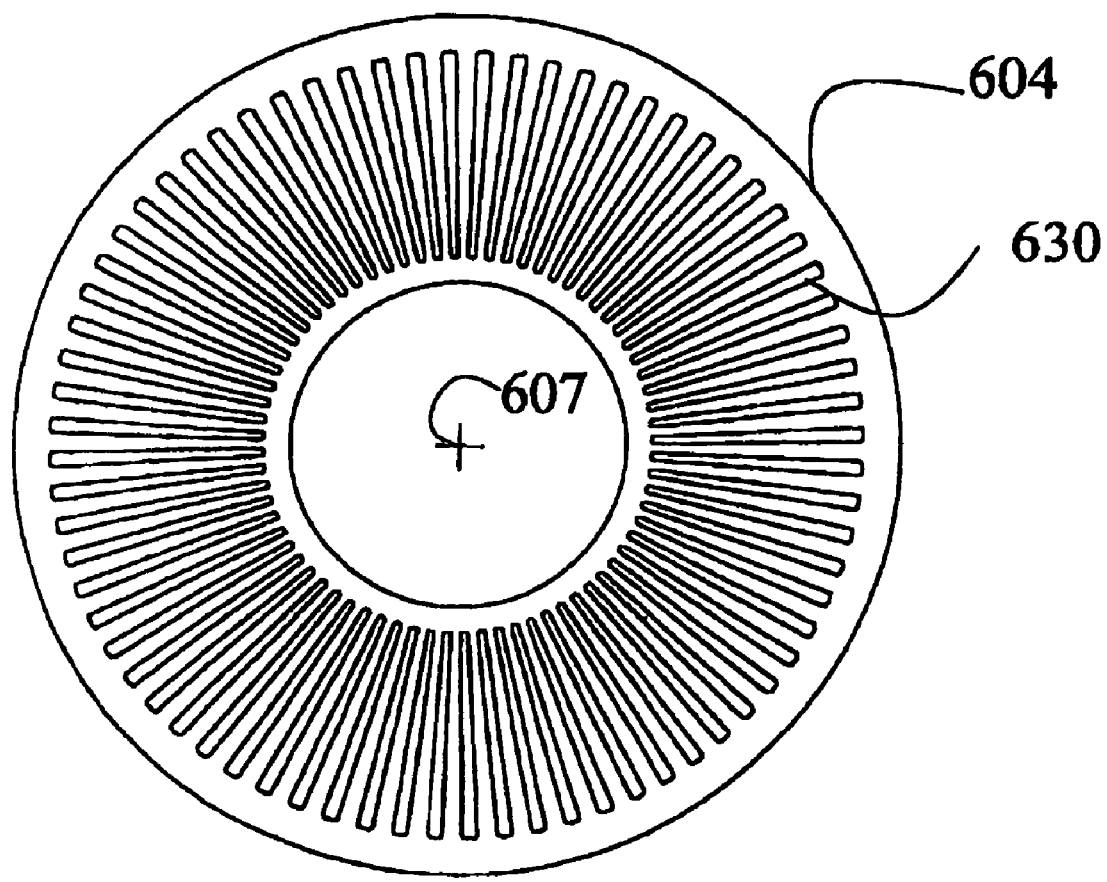
FIG. 21 illustrates the porting of a rotor in planes defined by lines 614-615 and 616-617.

FIG. 21 shows the porting of rotor 604 in the first and second valve faces respectively in the planes defined by arrows 614-615, and 616-617. An adsorber port 630 provides fluid communication directly from the first or second end of each adsorber to respectively the first or second valve face.

Figure 22:
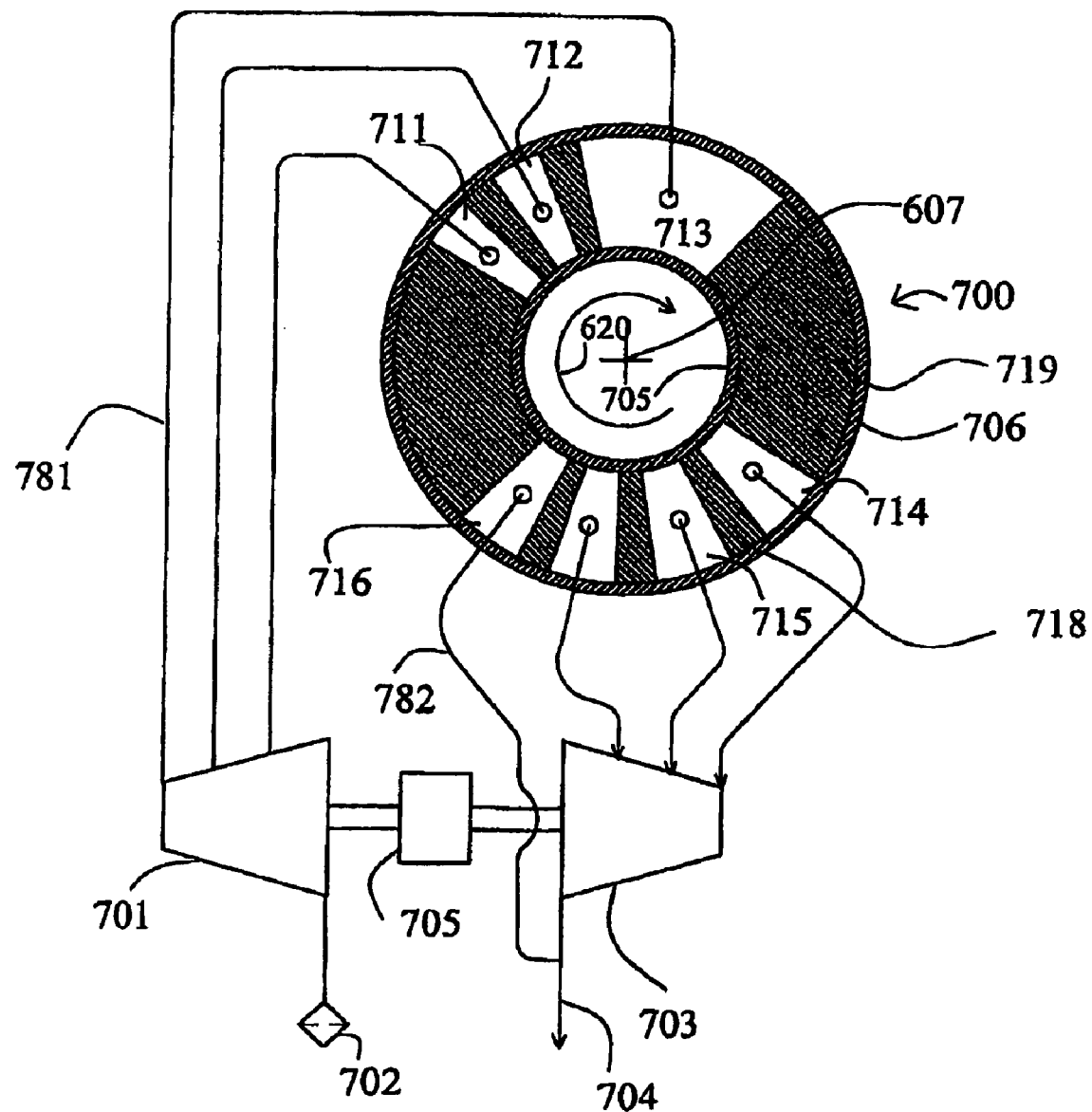
FIG. 22 illustrates a stator valve face in the plane defined by lines 614-615 with an exhaust compartment exhausting directly to a heavy product delivery conduit.

FIG. 22 shows the first stator valve face 700 of the first stator 608 in the first valve face 610, in the plane defined by arrows 614-615. Fluid connections are shown to a feed compressor 701 inducting feed air from inlet filter 702, and to an exhauster 703 delivering nitrogen-enriched second product to a second product delivery conduit 704. Compressor 701 and exhauster 703 are shown coupled to a drive motor 705.

Arrow 20 indicates the direction of rotation by the adsorber rotor. In the annular valve face between circumferential seals 706 and 707, the open area of first stator valve face 700 ported to the feed and exhaust compartments is indicated by clear angular segments 711-716 corresponding to the first functional ports communicating directly to functional compartments identified by the same reference numerals 711-716. The substantially closed area of valve face 700 between functional compartments is indicated by hatched sectors 718 and 719, which are slippers with zero clearance, or preferably a narrow clearance to reduce friction and wear without excessive leakage. Typical closed sector 718 provides a transition for an adsorber, between being open to compartment 714 and open to compartment 715. A tapering clearance channel between the slipper and the sealing face provides gradual opening, so as to achieve gentle pressure equalization of an adsorber being opened to a new compartment. Much wider closed sectors (e.g. 719) are provided to substantially close flow to or from one end of the adsorbers when pressurization or blowdown is being performed from the other end.

The feed compressor provides feed air to feed pressurization compartments 711 and 712, and to feed production compartment 713. Compartments 711 and 712 have successively increasing working pressures, while compartment 713 is at the higher working pressure of the PSA cycle. Compressor 701 may thus be a multistage or split stream compressor system delivering the appropriate volume of feed flow to each compartment so as to achieve the pressurization of adsorbers through the intermediate pressure levels of compartments 711 and 712, and then the final pressurization and production through compartment 713. A split stream compressor system may be provided in series as a multistage compressor with interstage delivery ports; or as a plurality of compressors or compression cylinders in parallel, each delivering feed air to the working pressure of a compartment 711 to 713. Alternatively, compressor 701 may deliver all the feed air to the higher pressure, with throttling of some of that air to supply feed pressurization compartments 711 and 712 at their respective intermediate pressures.

Similarly, exhauster 703 exhausts nitrogen-enriched heavy product gas from countercurrent blowdown compartments 714 and 715 at the successively decreasing working pressures of those compartments, and finally from exhaust compartment 716 which is at the lower pressure of the cycle. Similarly to compressor 701, exhauster 703 may be provided as a multistage or split stream machine, with stages in series or in parallel to accept each flow at the appropriate intermediate pressure descending to the lower pressure.

In the example embodiment of FIG. 22, the lower pressure is ambient pressure, so exhaust compartment 716 exhaust directly to heavy product delivery conduit 704. Exhauster 703 thus provides pressure letdown with energy recovery to assist motor 705 from the countercurrent blowdown compartments 714 and 715. For simplicity, exhauster 703 may be replaced by throttling orifices as countercurrent blowdown pressure letdown means from compartments 714 and 715.

Figure 23:
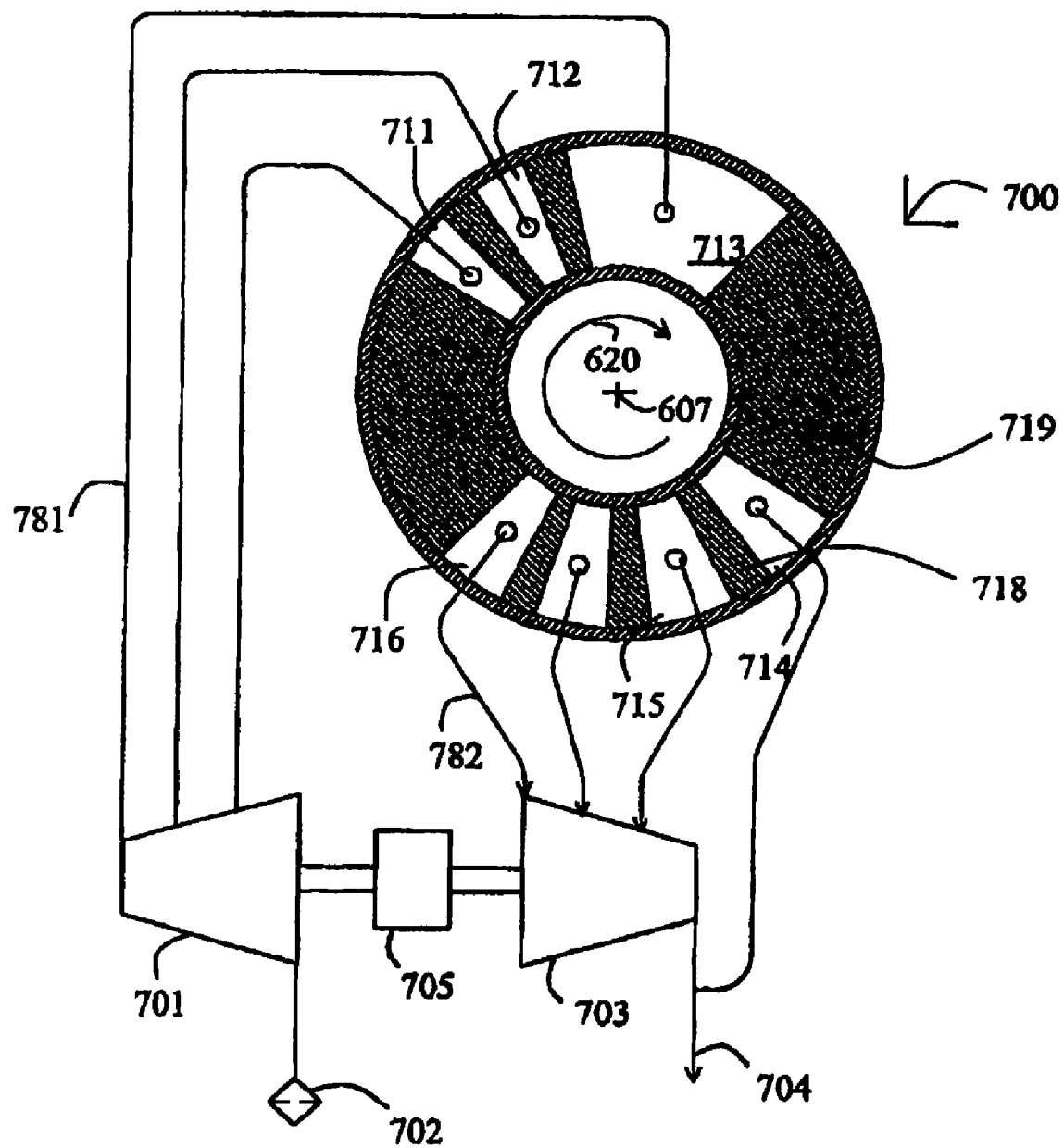
FIG. 23 illustrates a stator valve face in the plane defined by lines 614-615 with an exhauster comprising a vacuum pump and releasing a countercurrent blowdown stream at ambient pressure directly to a heavy product delivery conduit.

In some preferred embodiments, the lower pressure of the PSA cycle is subatmospheric. Exhauster 703 is then provided as a vacuum pump, as shown in FIG. 23. Again, the vacuum pump may be multistage or split stream, with separate stages in series or in parallel, to accept countercurrent blowdown streams exiting their compartments at working pressures greater than the lower pressure which is the deepest vacuum pressure. In FIG. 23, the early countercurrent blowdown stream from compartment 714 is released at ambient pressure directly to heavy product delivery conduit 704. If for simplicity a single stage vacuum pump were used, the countercurrent blowdown stream from compartment 715 would be throttled down to the lower pressure over an orifice to join the stream from compartment 716 at the inlet of the vacuum pump.

Figure 24:
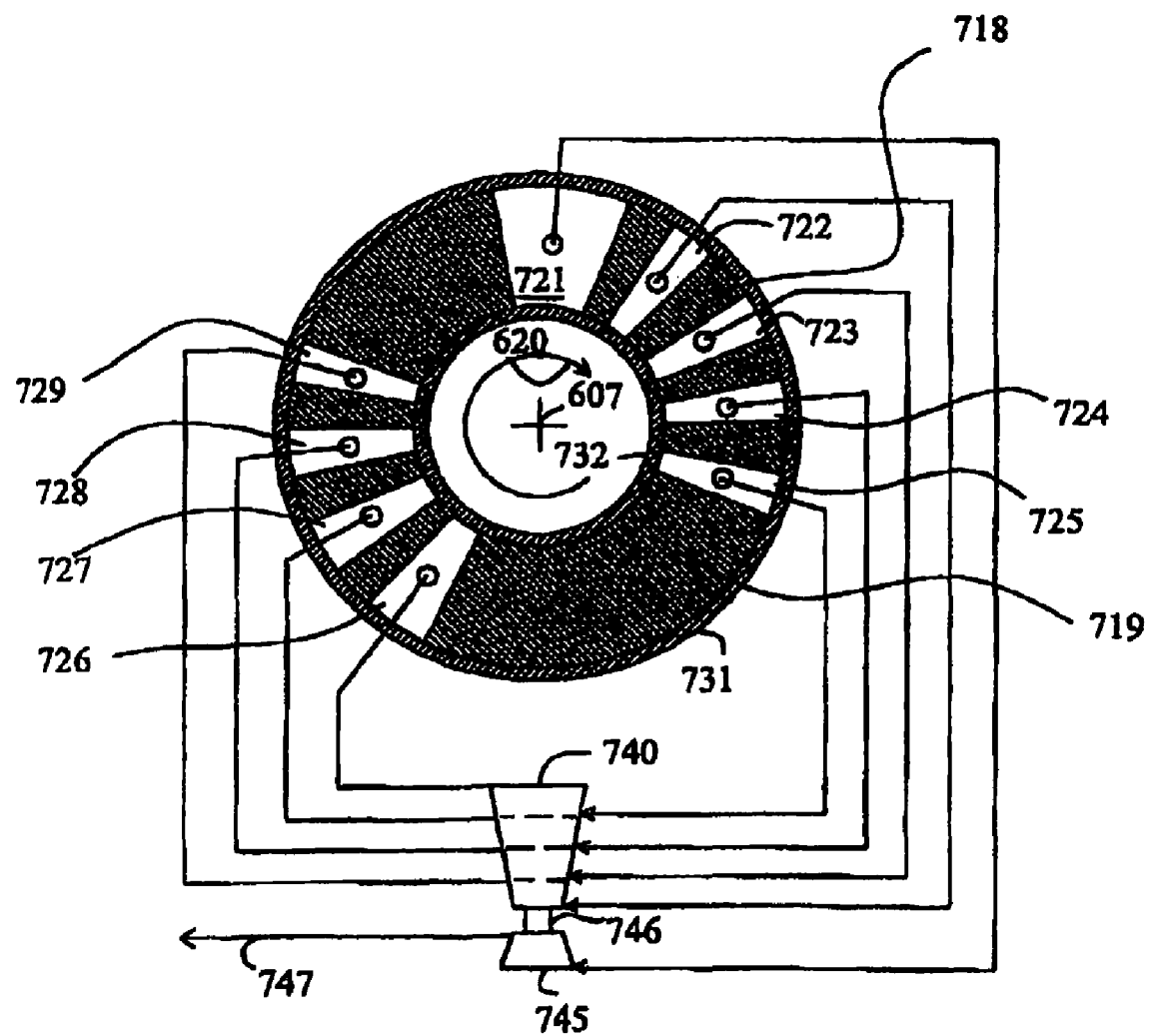
FIG. 24 illustrates a stator valve face along lines 616-617 of FIG. 26 and a split stream light reflux expander for light reflux pressure letdown with energy recovery.
Figure 25:
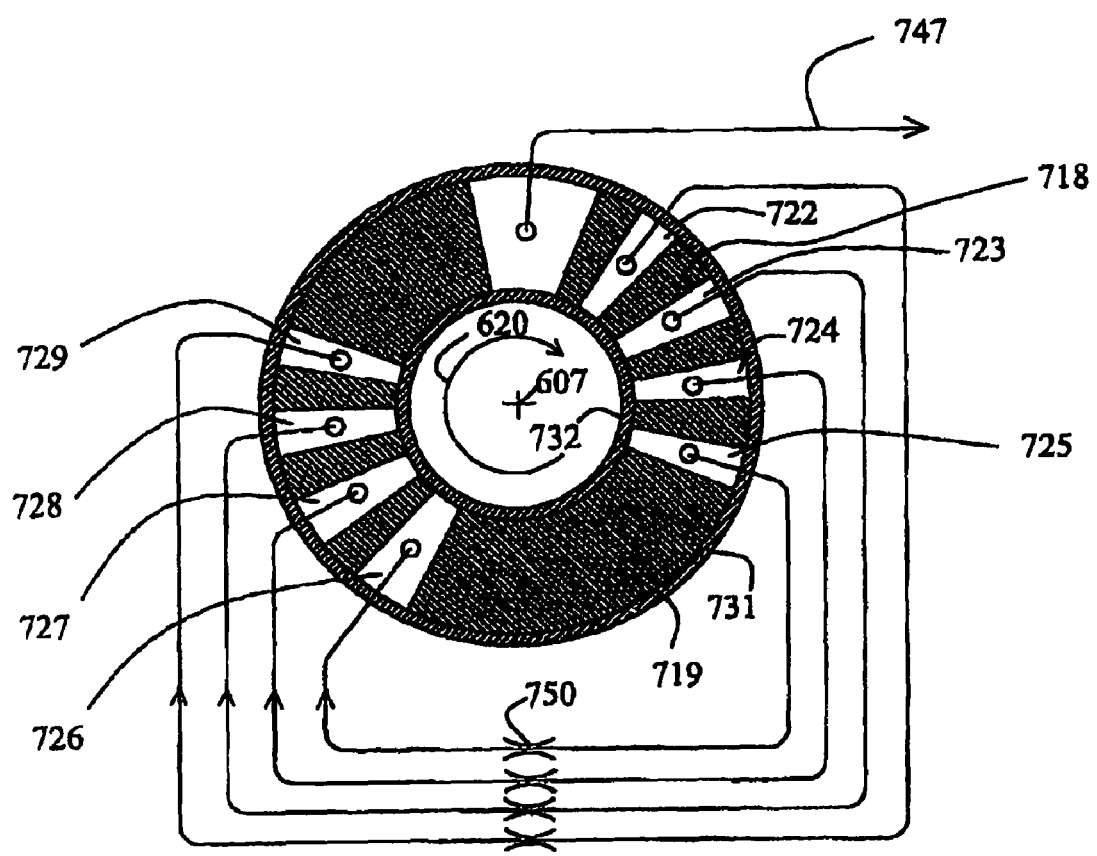
FIG. 25 illustrates a stator valve face along lines 616-617 and the use of a throttle orifice for pressure letdown.

FIGS. 24 and 25 show the second stator valve face, at section 616-617 of FIG. 19. Open ports of the valve face are second valve function ports communicating directly to a light product delivery compartment 721; a number of light reflux exit compartments 722, 723, 724 and 725; and the same number of light reflux return compartments 726, 727, 728 and 729 within the second stator. The second valve function ports are in the annular ring defined by circumferential seals 731 and 732. Each pair of light reflux exit and return compartments provides a stage of light reflux pressure letdown, respectively for the PSA process functions of supply to backfill, full or partial pressure equalization, and cocurrent blowdown to purge.

Illustrating the option of light reflux pressure letdown with energy recovery, a split stream light reflux expander 740 is shown in FIGS. 19 and 24 to provide pressure letdown of four light reflux stages with energy recovery. The light reflux expander provides pressure let-down for each of four light reflux stages, respectively between light reflux exit and return compartments 722 and 729, 723 and 728, 724 and 727, and 725 and 726 as illustrated. The light reflux expander 740 may power a light product booster compressor 745 by drive shaft 846, which delivers the oxygen enriched light product to oxygen delivery conduit 747 and compressed to a delivery pressure above the higher pressure of the PSA cycle. Illustrating the option of light reflux pressure letdown with energy recovery, a split stream light reflux expander 240 is provided to provide pressure letdown of four light reflux stages with energy recovery. The light reflux expander serves as pressure let-down means for each of four light reflux stages, respectively between light reflux exit and return compartments 722 and 729, 723 and 728, 724 and 727, and 725 and 726 as illustrated.

Light reflux expander 840 is coupled to a light product pressure booster compressor 845 by drive shaft 846. Compressor 845 receives the light product from conduit 625, and delivers light product (compressed to a delivery pressure above the higher pressure of the PSA cycle) to delivery conduit 850. Since the light reflux and light product are both enriched oxygen streams of approximately the same purity, expander 740 and light product compressor 745 may be hermetically enclosed in a single housing which may conveniently be integrated with the second stator as shown in FIG. 19. This configuration of a "turbocompressor" oxygen booster without a separate drive motor is advantageous, as a useful pressure boost of the product oxygen can be achieved without an external motor and corresponding shaft seals, and can also be very compact when designed to operate at very high shaft speeds.

FIG. 25 shows the simpler alternative of using a throttle orifice 750 as the pressure letdown means for each of the light reflux stages.

With reference to FIG. 19, compressed feed air is supplied to compartment 713 as indicated by arrow 725, while nitrogen enriched heavy product is exhausted from compartment 717 as indicated by arrow 726. The rotor is supported by bearing 760 with shaft seal 761 on rotor drive shaft 762 in the first stator 608, which is integrally assembled with the first and second valve stators. The adsorber rotor is driven by motor 763 as rotor drive means.

As leakage across outer circumferential seal 731 on the second valve face 611 may compromise enriched oxygen purity, and more importantly may allow ingress of atmospheric humidity into the second ends of the adsorbers which could deactivate the nitrogen-selective adsorbent, a buffer seal 770 is provided to provide more positive sealing of a buffer chamber 771 between seals 731 and 771. Even though the working pressure in some zones of the second valve face may be subatmospheric (in the case that a vacuum pump is used as exhauster 703), buffer chamber is filled with dry enriched oxygen product at a buffer pressure positively above ambient pressure. Hence, minor leakage of dry oxygen outward may take place, but humid air may not leak into the buffer chamber. In order to further minimize leakage and to reduce seal frictional torque, buffer seal 771 seals on a sealing face 772 at a much smaller diameter than the diameter of circumferential seal 731. Buffer seal 770 seals between a rotor extension 775 of adsorber rotor 604 and the sealing face 772 on the second valve stator 609, with rotor extension 775 enveloping the rear portion of second valve stator 609 to form buffer chamber 771. A stator housing member 780 is provided as structural connection between first valve stator 608 and second valve stator 609.

Figure 27:
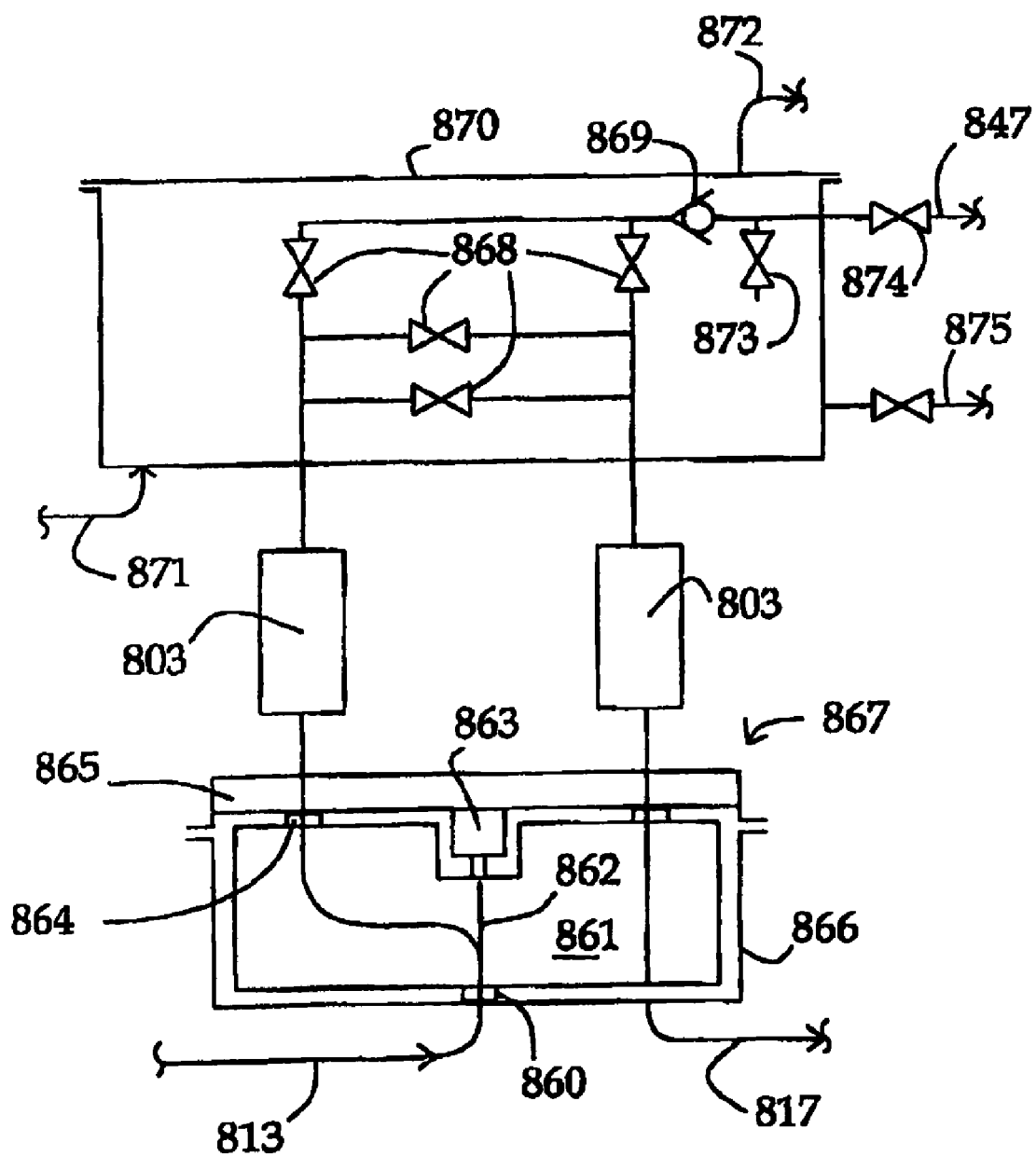
FIG. 27 is a schematic cross section of a stationary bed rotary PSA.

FIG. 27 depicts a stationary bed system, where the feed ends of adsorbers 803 use a rotary valve to synchronize flows. The light product end uses some valve switching in order to affect a PSA process. Feed gas is transported via conduit 813 to heavies valve 867, through dynamic seal 860 and rotor body 861, rotating about axis 862 by motor 863. Feed flow is directed to seal 864 and through stator housing 865 to adsorber 803. Exhaust gases are directed from adsorber 803 through stator housing 865, seal 864, and rotor body 861. The fluids are contained by second stator housing 866 in coordination with stator housing 865, and withdrawn via conduit 817.

The light product end of the adsorbers 803 are depicted as conventional conduit with directional valves 868 used to provide synchronized pressure and flow cycling in coordination with the feed end valve 867, and the adsorbers 803, with the product fluid being delivered by product conduit 847. Note that this drawing depicts only the simplest 2-adsorber PSA and that it represents all PSA configurations with a rotary feed valve and conventional valve arrangements for the light product end fluids. The light product end system is completely enclosed in an impermeable container 870, where tight fluid sealing is achieved across the whole boundary. In this option, atmospheric borne contaminants are not able to enter into the process across the valve stem actuators, which are the process containment seals. The static buffer space (the space around the valves bounded by static sealing) is preferably filled with a buffer fluid, introduced by a buffer fluid supply leading to port 871. A positive pressure gradient over the ambient pressure is a preferred option. This buffer fluid is also preferably circulated and refreshed by allowing the fluid to be withdrawn by port 872.

One way valve 869 can be used to minimize reverse flow of any contaminant coming from down stream equipment or processes, as well as the preferred option of using product gas as the buffer fluid by closing valve 874 and allowing the product fluid to enter container 870 via valve 873, and to allow the product to be withdrawn from the container 873 through product conduit 875.

Figure 28:
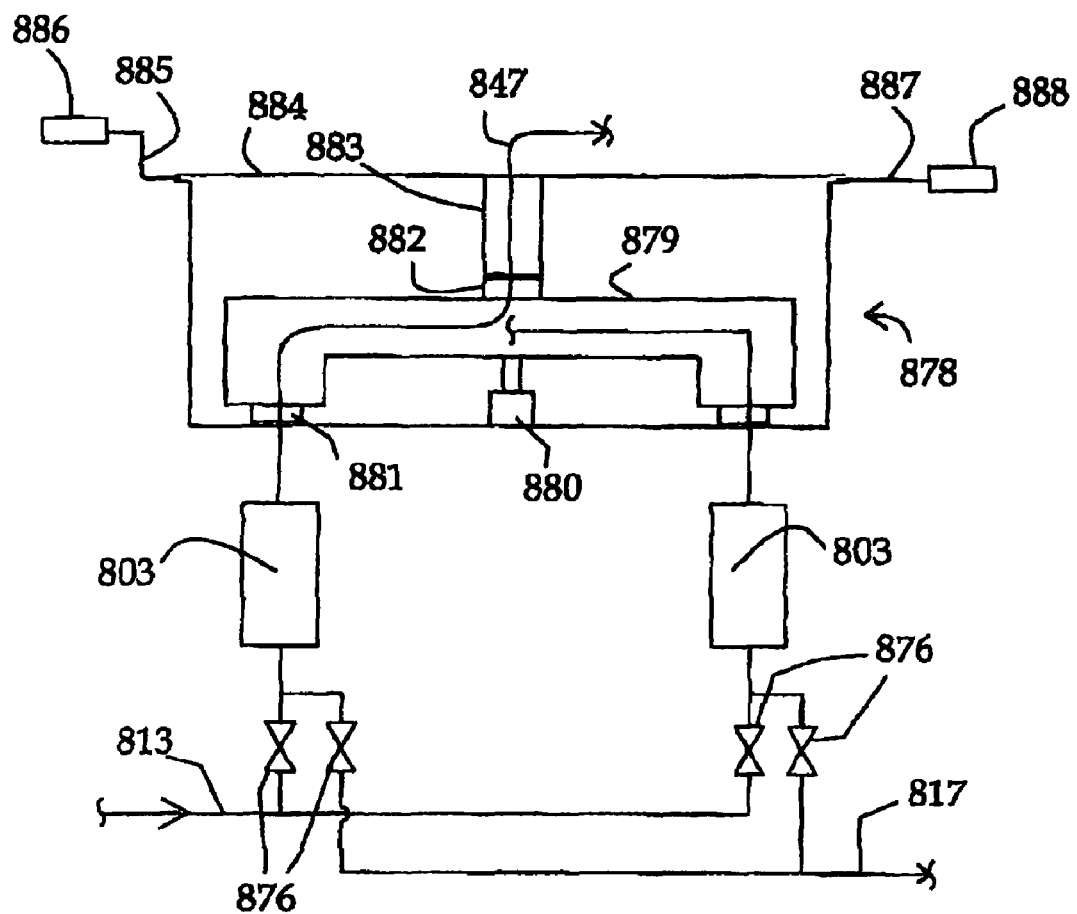
FIG. 28 is a schematic cross section of a stationary bed rotary PSA.

FIG. 28 also depicts a rotary PSA system, wherein the light product end of adsorbers 803 uses a multi-port rotary distributor valve to synchronize pressure and flow cycles. The lights valve 878 contains a rotor 879 being rotated by motor 880, and where dynamic seals 881 communicate with the adsorbers 803 in a cyclic manner. Feed gas is allowed in conduit 813 to a set of directional valves 876, and is then directed to one of the adsorbers 803, where product gas is drawn off through seal 881, through lights rotor 879, and into product conduit 847 via dynamic seal 882 and product port 883. The dynamic seals 881 and 882 are process containment seals, and in the configuration where lights valve housing 884 is not sealed, they are also the primary seal, and have the least amount of resistance to contaminant ingress from the surrounding atmosphere. In one option, the housing 884 can be sealed, in order to create a static buffer space that can be protected as discussed above. Another option is to allow the static buffer chamber to breathe through breather 885 coupled to blanket gas supply 886. Another preferred option is to allow the static buffer chamber to breathe through breather 887, and preferably through guard trap 888. Exhaust gases are withdrawn from adsorber 803 via directional valve 876 and through conduit 817.

A combination of devices shown in FIGS. 27 and 28, such as heavies valve 867, coupled to adsorbers 803 and to lights valve 878 is also considered a rotary PSA and is able to benefit from the invention. A system consisting of the light product end valves 868 with associated conduits, along with adsorbers 803 and first end valves 878 and associated conduits consist of conventional PSA, and can be seen to also benefit from the invention.

The present invention has been described with respect to certain embodiments. The scope of the invention should not be limited to these described embodiments, but rather should be determined by reference to the following claims.

We claim:

1. An adsorber element having at least one channel, comprising:
   an adsorbent laminate sheet; and
   a woven metal mesh spacer having a first wire configuration in a direction parallel to the at least one channel and a second wire configuration at an angle to the at least one channel.

2. The adsorber element of claim 1 where wires of the first wire configuration have a different diameter than wires of the second wire configuration.

3. The adsorber element of claim 1 where wires of the first wire configuration are aligned in a direction parallel to the at least one channel and wires of the second wire configuration are aligned in a direction perpendicular to the at least one channel.

4. The adsorber element of claim 3 where wires aligned parallel to the at least one channel have a larger diameter than wires aligned perpendicular to the at least one channel.

5. The adsorber element of claim 1 where the adsorbent laminate sheet has a first end and a second end, and the spacer has a dimension that changes from the first end to the second end.

6. The adsorber element of claim 3 where wires aligned parallel to the at least one channel direction are separated by a first interval and wires aligned perpendicular to the at least one channel direction are separated by a second interval.

7. The adsorber element of claim 6 where the first interval is different from the second interval.

8. The adsorber element of claim 6 where the first interval is smaller than the second interval.

9. The adsorber element of claim 1 where wires of the first wire configuration have substantially equal diameters to wires of the second wire configuration.

10. The adsorber element of claim 9 where the first wire configuration is aligned in a direction parallel to the at least one channel and the second wire configuration is aligned in a direction perpendicular to the at least one channel.

11. The adsorber element of claim 1 where the first wire configuration and second wire configuration define a geometric shape.

12. The adsorber element of claim 11 where wires of the first wire configuration are aligned in a first direction and separated by a first interval and wires of the second configuration are aligned in a second direction and separated by a second interval, where the first and second direction and the first and second interval define the geometric shape.

13. The adsorber element of claim 12 where the geometric shape is a rectangle, a square, a parallelogram, or combinations thereof.

14. The adsorber element of claim 1 where the adsorber element is spirally wound.

15. The adsorber element of claim 1 where the adsorbent laminate sheet further comprises an adsorbent or catalyst selected from molecular sieves, zeolites, activated alumina, activated carbon, carbon molecular sieves, silica gel, or combinations thereof.

16. A PSA apparatus comprising a containment chamber comprising a laminate adsorber element and a spider adjacent an end of the laminate adsorber element wherein the spider prevents axial movement of the laminate adsorber element in the chamber.

17. The PSA apparatus of claim 16 wherein the spider is unitary.

18. The PSA apparatus of claim 17 wherein the spider comprises an outer ring and an inner ring connected by a plurality of spokes.

19. The PSA apparatus of claim 16 wherein the laminate adsorber element comprises a central mandrel and the spider is coupled to the mandrel.

20. The PSA apparatus of claim 16 further comprising an optional retainer disk and filter adjacent the spider.

21. The PSA apparatus of claim 16 wherein the spider is made of metal.

22. The PSA apparatus of claim 16 wherein the spider is adjacent an end of the containment chamber.

23. The PSA apparatus of claim 16 wherein the laminate adsorber element is spirally wound.

24. The PSA apparatus of claim 16 comprising more than one laminate adsorber element wherein the spider is located between two laminate adsorber elements.

25. The PSA apparatus of claim 24 comprising a plurality of laminate adsorber elements and spiders wherein the spiders are located between laminate adsorber elements.

26. The PSA apparatus of claim 16 comprising spiders adjacent both ends of the laminate adsorber element.

* * * * *